United States Patent
Boeder et al.

(10) Patent No.: US 9,927,155 B2
(45) Date of Patent: Mar. 27, 2018

(54) MAGNETIC REFRIGERATION SYSTEM WITH UNEQUAL BLOWS

(71) Applicant: Astronautics Corporation of America, Milwaukee, WI (US)

(72) Inventors: Andre Michael Boeder, Monona, WI (US); Jeremy Jonathan Chell, Madison, WI (US); Steve Alan Jacobs, Madison, WI (US); John Paul Leonard, Cambridge, WI (US); Jon Jay Auringer, Poynette, WI (US); Carl Bruno Zimm, Madison, WI (US); Bryant Wayne Mueller, Madison, WI (US)

(73) Assignee: ASTRONAUTICS CORPORATION OF AMERICA, Milwaukee, WI (US)

( * ) Notice: Subject to any disclaimer, the term of this patent is extended or adjusted under 35 U.S.C. 154(b) by 373 days.

(21) Appl. No.: 14/567,835

(22) Filed: Dec. 11, 2014

(65) Prior Publication Data
US 2016/0076797 A1    Mar. 17, 2016

Related U.S. Application Data

(60) Provisional application No. 62/050,284, filed on Sep. 15, 2014.

(51) Int. Cl.
F25B 21/00    (2006.01)

(52) U.S. Cl.
CPC ...... *F25B 21/00* (2013.01); *F25B 2321/0022* (2013.01); *Y02B 30/66* (2013.01)

(58) Field of Classification Search
CPC .................. F25B 21/00; F25B 2321/0022
See application file for complete search history.

(56) References Cited

U.S. PATENT DOCUMENTS

| | | | |
|---|---|---|---|
| 4,332,135 A | 6/1982 | Barclay et al. | |
| 6,526,759 B2* | 3/2003 | Zimm | F25B 21/00 62/3.1 |
| 6,668,560 B2 | 12/2003 | Zimm et al. | |
| 6,946,941 B2 | 9/2005 | Chell | |
| 7,536,866 B2* | 5/2009 | Kobayashi | F25B 21/00 62/3.1 |

(Continued)

OTHER PUBLICATIONS

International Journal of Refrigeration 37 (2014) 84-91; http://www.sciencedirect.com/science/article/pii/s014070073002594.*

(Continued)

*Primary Examiner* — Emmanuel Duke
(74) *Attorney, Agent, or Firm* — Foley & Lardner LLP

(57) ABSTRACT

A magnetic refrigeration apparatus includes beds of magnetocaloric material with a hot side and a cold side. The apparatus also includes a magnet to apply a magnetic field to the beds, a heat transfer fluid, a pump to circulate the heat transfer fluid, a hot side heat exchanger, a cold side heat exchanger, and a controller to control the flow of heat transfer fluid from the cold side to the hot side of the beds when the magnetic field on the beds is high at an average flow rate of $\Phi H$ for a duration $\Delta tH$. The controller also controls the flow of heat transfer fluid from the hot side of the beds to the cold side of the beds when the magnetic field on the beds is low at an average flow rate of $\Phi C$ for a duration $\Delta tC$, where $\Delta tC > \Delta tH$ and $\Phi C < \Phi H$.

29 Claims, 23 Drawing Sheets

(56) References Cited

U.S. PATENT DOCUMENTS

| | | | |
|---|---|---|---|
| 7,757,498 B2 | 7/2010 | Wolski et al. | |
| 8,072,110 B2 | 12/2011 | Ida et al. | |
| 2009/0217675 A1* | 9/2009 | Kobayashi | F25B 21/00 62/3.1 |
| 2009/0266083 A1 | 10/2009 | Shin et al. | |
| 2012/0222428 A1* | 9/2012 | Celik | F25B 21/00 62/3.1 |
| 2014/0165595 A1 | 6/2014 | Zimm et al. | |

OTHER PUBLICATIONS

A. Rowe, "Performance Metrics for Active Magnetic Refrigerators," Proc. Third IIF-IIR International Conference on Magnetic Refrigeration at Room Temperature, pp. 195-204 (2009).

Engelbrecht, et al., "Recent Developments in Room Temperature Active Magnetic Regenerative Refrigeration," HVAC&R Research, 13(4): pp. 525-542, 2007.

Gschneidner, et al., "Thirty years of near room temperature magnetic cooling: Where we are today and future prospects," Int. J. of Refrig. 31: pp. 945-961, 2008.

Jacobs, et al., "The Performance of a Large-Scale Rotary Magnetic Refrigerator," Proceedings of the 5th International Conference on Magnetic Refrigeration at Room Temperature, Sep. 2012; published in the International Journal of Refrigeration, 37 (2014), pp. 84-91.

K. Engelbrecht, "A Numerical Model of an Active Magnetic Regenerator Refrigerator with Experimental Validation," Ph.D. Thesis, University of Wisconsin-Madison (2008).

S. Jacobs, "Modeling and optimal design of a multilayer active magnetic refrigeration system," Proc. 3rd Int. Conf on Mag. Refrig. at Room Temp., pp. 267-273 (2009).

International Search Report and Written Opinion in International Application No. PCT/US2014/070129 dated Mar. 17, 2015 (13 pages).

\* cited by examiner

Cold Blow
(Demagnetized Bed)

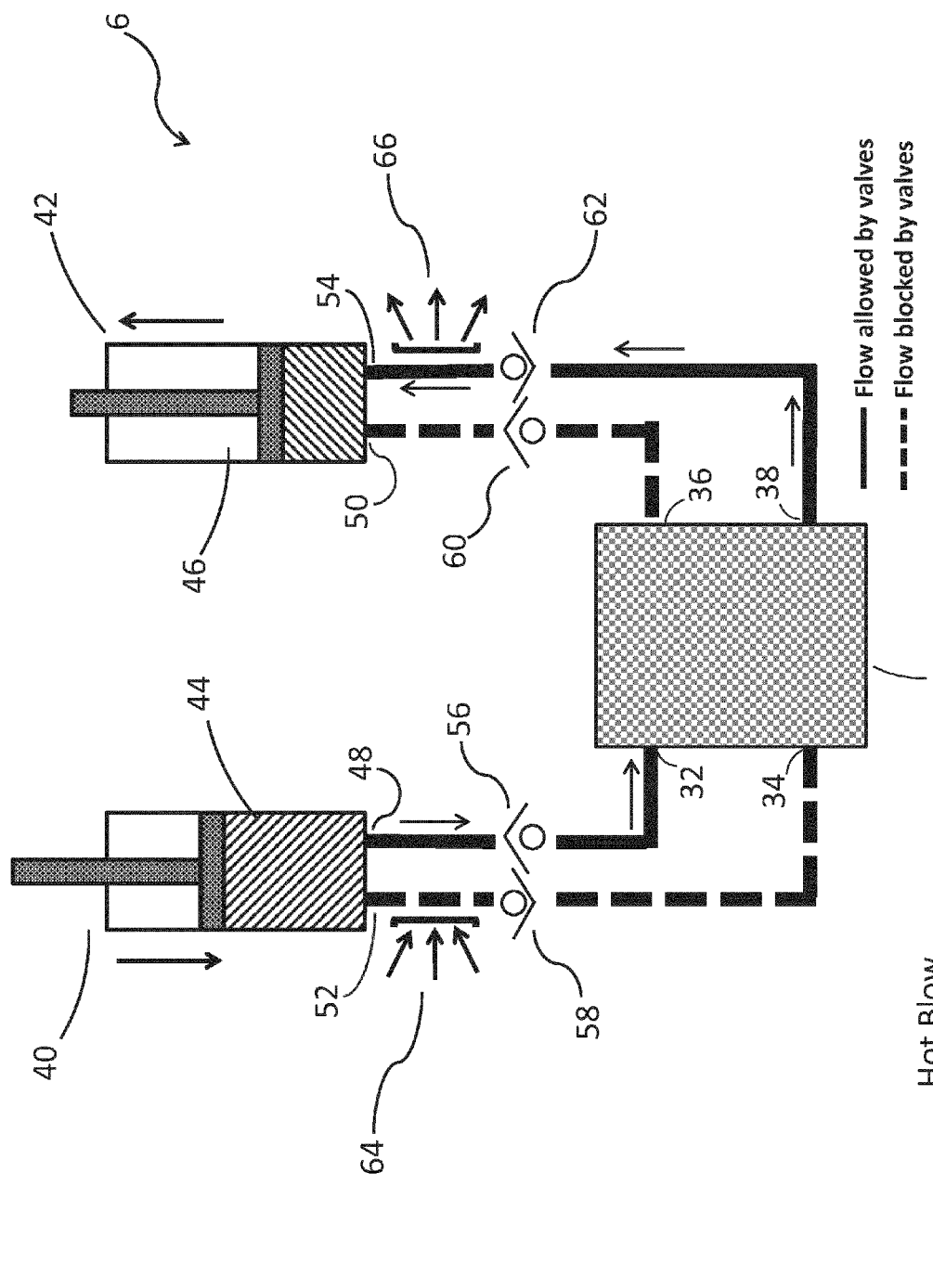
Fig. 6B   Hot Blow (Magnetized Bed)

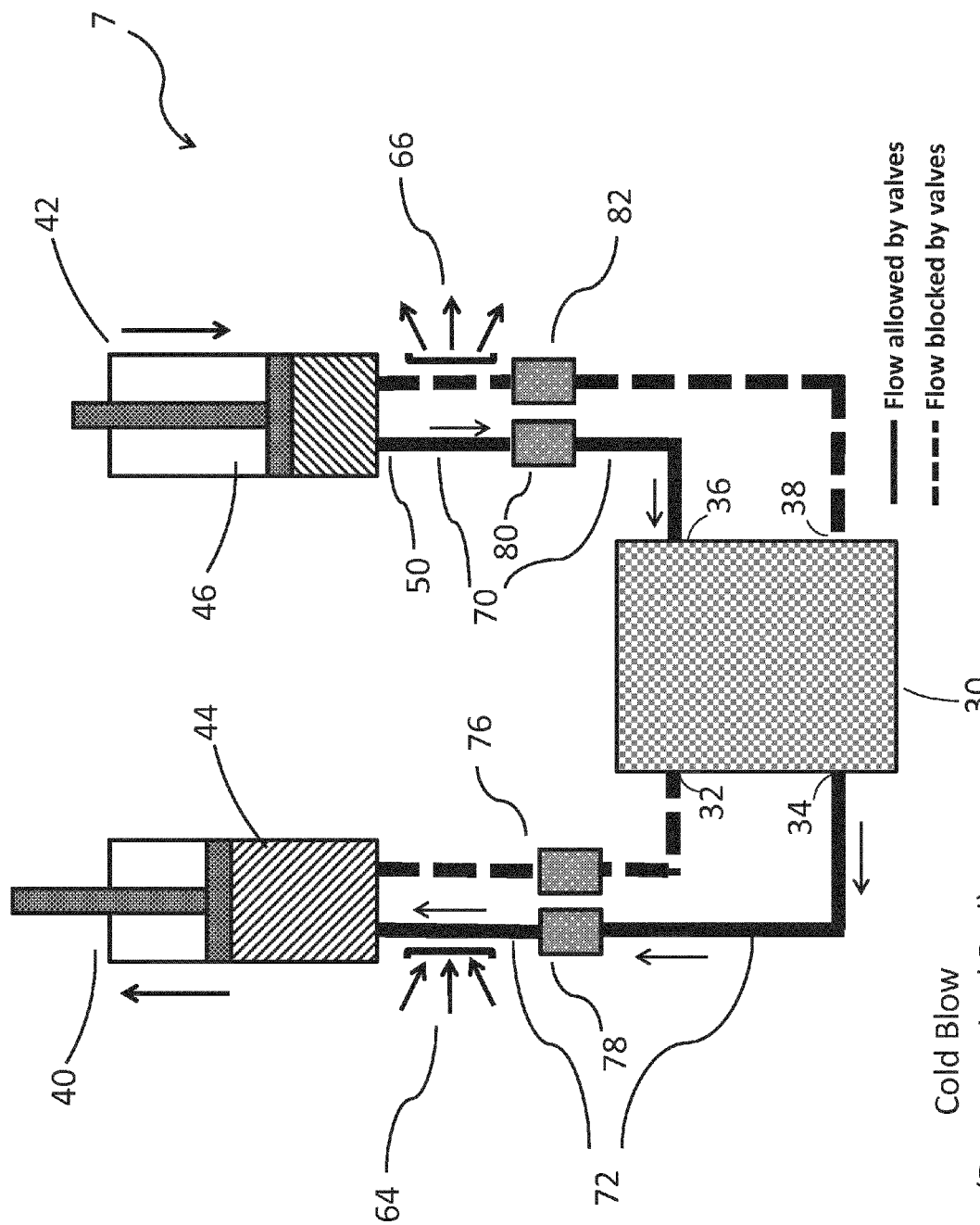

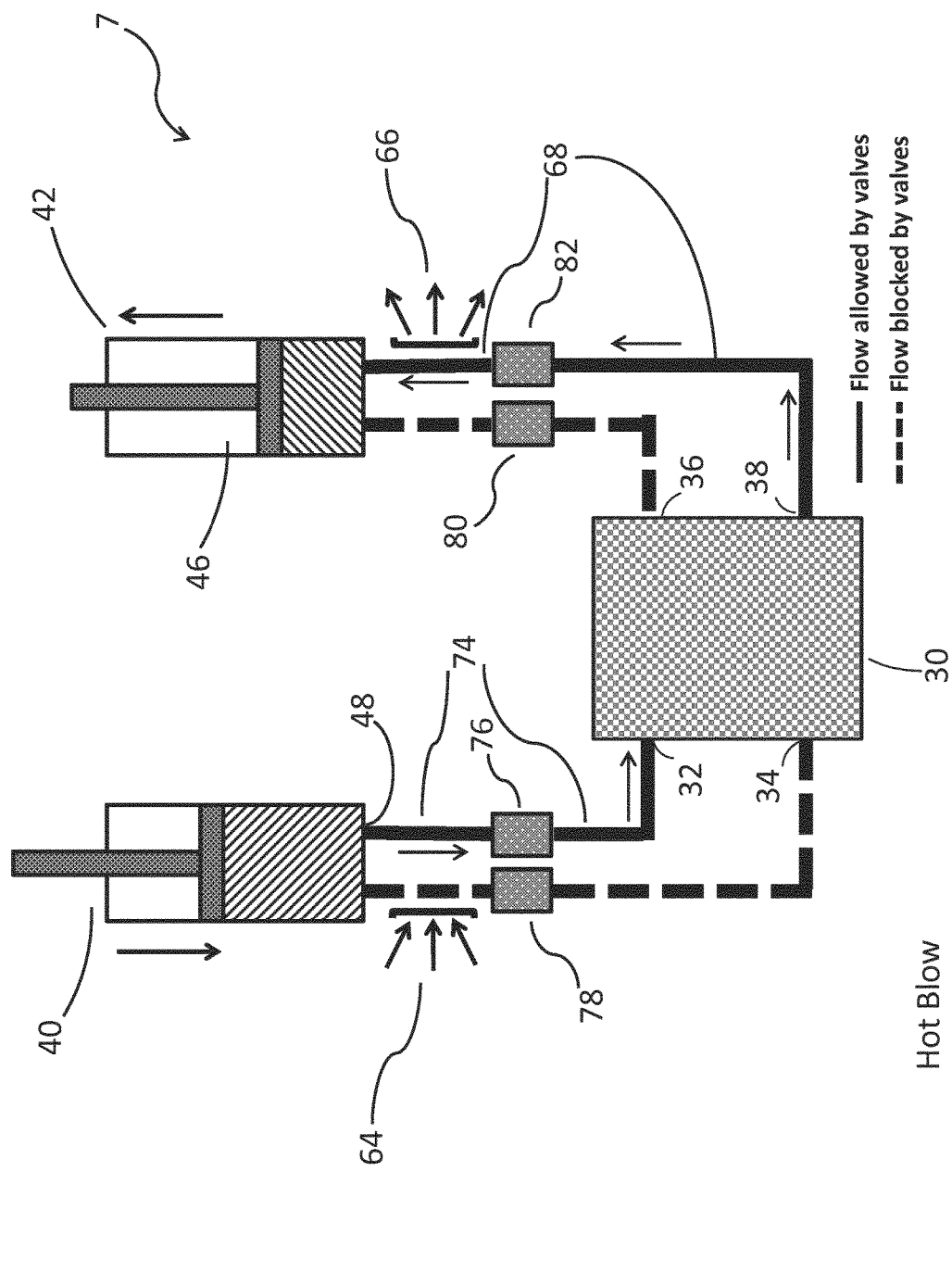
Fig. 7B  Hot Blow (Magnetized Bed)

| Angular Extent (degrees) | NdFeB Mass (kg) |
|---|---|
| 160 | 56.7 |
| 150 | 54.3 |
| 140 | 51.6 |
| 120 | 44.4 |
| 110 | 42.4 |

Fig. 18

MAGNETIC REFRIGERATION SYSTEM WITH UNEQUAL BLOWS

CROSS-REFERENCE TO RELATED APPLICATIONS

The present application claims the benefit of U.S. Provisional Patent Application Ser. No. 62/050,284 filed Sep. 15, 2014, which is incorporated herein by reference in its entirety.

FEDERAL FUNDING STATEMENT

This invention was made with Government support under DE-AR0000128 awarded by U.S. Department of Energy. The U.S. Government has certain rights in this invention.

BACKGROUND

Magnetic refrigeration (MR) refers generally to refrigeration systems that take advantage of the magnetocaloric effect of certain magnetocaloric materials. The magnetocaloric effect refers in part to the temperature change of a magnetocaloric material that occurs as a result of exposure of the magnetocaloric material to a changing magnetic field. Modern room-temperature magnetic refrigeration (MR) systems may employ an Active Magnetic Regenerator (AMR) cycle to perform cooling.

SUMMARY

A magnetic refrigeration system includes one or more beds of magnetocaloric material, each having a hot side and a cold side and a magnet configured to apply a time-varying magnetic field to the one or more beds in a high state and a low state. The system can further comprise a heat transfer fluid, a hot side heat exchanger (HHEX), a cold side heat exchanger (CHEX) and a pump configured to circulate the heat transfer fluid through the one or more beds, the HHEX, and the CHEX. The system can also include a valve configured to control flow of the heat transfer fluid at an average flow rate of $\Phi_H$ for a duration of $\Delta t_H$ from the cold side of the one or more beds to the hot side of the respective bed and through the HHEX when the time-varying magnetic field applied to the respective bed is in the high state. The valve can be further configured to control flow of the heat transfer fluid at an average flow rate of $\Phi_C$ for a duration $\Delta t_C$ from the hot side of the one or more beds to the cold side of the respective bed and through the CHEX when the time-varying magnetic field applied to the respective bed is in the low state. Relationships of the flow rates and the durations can include $\Delta t_C > \Delta t_H$, $\Phi_C < \Phi_H$, and $\Delta t_H \Phi_H = \Delta t_C \Phi_C$.

A magnetic refrigeration apparatus can include a plurality of beds of magnetocaloric material, each having a hot side and a cold side, and a magnet configured to apply a time-varying magnetic field to the plurality of beds in a high state and a low state. The apparatus can further include a heat transfer fluid, a hot side heat exchanger (HHEX), a cold side heat exchanger (CHEX), and a pump configured to circulate the heat transfer fluid through the plurality of beds, the HHEX, and the CHEX. The apparatus can also include a first inlet valve comprising a first part with a series of holes, each connected to the cold side of a bed of the plurality of beds, and a second part with a slot fluidly connected to the CHEX, a first outlet valve comprising a first part with a series of holes, each connected to the hot side of a bed of the plurality of beds, and a second part with a slot fluidly connected to the HHEX, a second inlet valve comprising a first part with a series of holes, each connected to a hot side of a bed of the plurality of beds, and a second part with a slot fluidly connected to the HHEX, and a second outlet valve comprising a first part with a series of holes, each connected to a cold side of a bed of the plurality of beds, and a second part with a slot fluidly connected to the CHEX. The slot in the first inlet valve and the slot in the first outlet valve can be configured to allow flow of heat transfer fluid at an average flow rate of $\Phi_H$ for a duration $\Delta t_H$ from the cold side of each of the beds to the hot side of each of the beds when the magnetic field applied to the respective bed is in the high state. The slot in the second inlet valve and the slot in the second outlet valve can be configured to allow flow of heat transfer fluid at an average flow rate of $\Phi_C$ for a duration $\Delta t_C$ from the hot side of each of the beds to the cold side of each of the beds when the magnetic field applied to the respective bed is in the low state. Relationships of the flow rates and the durations can include $\Delta t_C > \Delta t_H$, $\Phi_C < \Phi_H$, and $\Delta t_H \Phi_H = \Delta t_C \Phi_C$.

A magnetic refrigeration apparatus can comprise a plurality of beds of magnetocaloric material, each having a hot side and a cold side, and a magnet configured to apply a time-varying magnetic field to the plurality of beds. The apparatus can also include a heat transfer fluid, a hot side heat exchanger (HHEX), a cold side heat exchanger (CHEX), and a pump configured to circulate the heat transfer fluid through the plurality of beds, the HHEX, and the CHEX. The apparatus can further include a cold side valve with a first radius from a center of the cold side valve and a second radius from the center of the cold side valve comprising a first part with a first series of holes along the first radius and a second series of holes along the second radius, wherein the first series of holes each fluidly connect to a cold inlet conduit of each of the plurality of beds, and wherein the second series of holes each connect to a cold outlet conduit of each of the plurality of beds, and also comprising a second part with a first slot along the first radius fluidly connected to an outlet of the CHEX and a second slot along the second radius fluidly connected to an inlet of the CHEX. The apparatus can also include a hot side valve with a third radius from a center of the hot side valve and a fourth radius from the center of the hot side valve comprising a first part with a third series of holes along the third radius and a fourth series of holes along the fourth radius, wherein the third series of holes each fluidly connect to a hot inlet conduit of each of the plurality of beds, and wherein the fourth series of holes each fluidly connect to a hot outlet conduit of each of the plurality of beds, and a second part with a third slot along the third radius fluidly connected to an outlet of the HHEX and a fourth slot along the fourth radius fluidly connected to an inlet of the HHEX. The first slot, the second slot, the third slot, and the fourth slot can be configured to allow flow of heat transfer fluid at an average flow rate of $\Phi_H$ for a duration $\Delta t_H$, from the cold side of each of the plurality of beds to the hot side of the respective bed when the magnetic field applied to the respective bed is in the high state. The first slot, the second slot, the third slot, and the fourth slot can be further configured to allow flow of heat transfer fluid at an average flow rate of $\Phi_C$ for a duration $\Delta t_C$ from the hot side of each of the plurality of beds to the cold side of the respective bed when the magnetic field applied to the respective bed is in the low state. Relationships of the flow rates and the durations can include $\Delta t_C > \Delta t_H$ and $\Phi_C < \Phi_H$ and $\Delta t_H \Phi_H = \Delta t_C \Phi_C$.

A magnetic refrigeration and fluid chilling apparatus can include one or more beds of magnetocaloric material, each having a hot side and a cold side, and a magnet configured to apply a time-varying magnetic field to the one or more beds in a high state and a low state. The apparatus can further include a heat transfer fluid, a hot side heat exchanger (HHEX), a cold side heat exchanger (CHEX), a fluid chilling heat exchanger (HEX), and a pump configured to circulate the heat transfer fluid through the one or more beds, the HHEX, the CHEX, and the HEX. The apparatus can also include a valve configured to control flow of the heat transfer fluid at an average flow rate of $\Phi_H$ for a duration $\Delta t_H$ from the cold side of each of the one or more beds to the hot side of each of the one or more beds when the magnetic field applied to the respective bed is in the high state. The valve can be further configured to control flow of the heat transfer fluid at an average flow rate of $\Phi_C$ for a duration $\Delta t_C$ from the hot side of each of the one or more beds to the cold side of each of the one or more beds when the magnetic field applied to the respective bed is in the low state. The valve can be further configured to direct a fraction f of the heat transfer fluid emerging from the cold side of each of the one or more beds to the HEX and to the hot side of the respective bed when the magnetic field applied to the respective bed is in the low state. Relationships of the flow rates, the durations and the fraction f of the heat transfer fluid can include $\Delta t_C > \Delta t_H$, and $\Delta t_H \Phi_H = (1-f)\Delta t_C \Phi_C$.

A method can comprise rotating a plurality of beds of magnetocaloric material into and out of a magnetic field of a magnet to create a time-varying magnetic field with a high state and a low state, wherein the time-varying magnetic field is applied to each of the plurality of beds. The method can also include rotating a valve to control flow of a heat transfer fluid at an average flow rate of $\Phi_H$ for a duration of $\Delta t_H$ from a cold side of each of the plurality of beds to a hot side of the respective bed when the time-varying magnetic field applied to the respective bed is in the high state. The valve can control flow of the heat transfer fluid an average flow rate of $\Phi_C$ for a duration $\Delta t_C$ from the hot side of each of the plurality of beds to the cold side of the respective bed when the time-varying magnetic field applied to the respective bed is in the low state. Relationships of the flow rates and the durations can include $\Delta t_C > \Delta t_H$, $\Phi_C < \Phi_H$, and $\Delta t_H \Phi_H = \Delta t_C \Phi_C$.

A method can comprise rotating a magnetic field of a magnet about a plurality of beds of magnetocaloric material to create a time-varying magnetic field with respect to each of the plurality of beds with a high state and a low state. The method can also include rotating a valve to control flow of a heat transfer fluid at an average flow rate of $\Phi_H$ for a duration of $\Delta t_H$ from a cold side of each of the plurality of beds to a hot side of the respective bed when the time-varying magnetic field applied to the respective bed is in the high state. The valve can control flow of the heat transfer fluid an average flow rate of $\Phi_C$ for a duration $\Delta t_C$ from the hot side of each of the plurality of beds to the cold side of the respective bed when the time-varying magnetic field applied to the respective bed is in the low state. Relationships of the flow rates and the durations can include $\Delta t_C > \Delta t_H$, $\Phi_C < \Phi_H$, and $\Delta t_H \Phi_H = \Delta t_C \Phi_C$.

BRIEF DESCRIPTION OF THE DRAWINGS

FIGS. 6A and 6B illustrate a schematic view of a magnetic refrigeration system having two identical linear displacers in accordance with an illustrative embodiment.

FIGS. 7A and 7B illustrate a schematic view of a magnetic refrigeration system having four controlled valves, two on the cold side and two on the hot side, in accordance with an illustrative embodiment.

FIG. 18 is a table illustrating NdFeB masses for various different angular extents in accordance with an illustrative embodiment.

DETAILED DESCRIPTION

Magnetic refrigeration (MR) is an emerging cooling technology that is based on the magnetocaloric effect, a property exhibited by certain materials which heat up when placed in a magnetic field and cool down when the field is removed. Magnetic refrigeration offers a number of distinct advantages over vapor compression, which is currently the most widely-used method for cooling. First, MR uses no hydrofluorocarbons (HFCs), chlorofluorocarbons (CFCs), or any other gaseous material. Rather, the refrigerant in the MR system is in the form of a porous solid. The absence of any gases greatly reduces the potential for leaks, which is a common problem in vapor compression systems. As a result, MR systems can have greater reliability with reduced maintenance and downtime. The elimination of HFCs and CFCs has benefits for the environment, as these gases are ozone-depleting and contribute to global warming. Finally, theoretical studies demonstrate that MR systems can be more energy-efficient than vapor compression systems, particularly under off-peak load conditions.

Figure 1A:
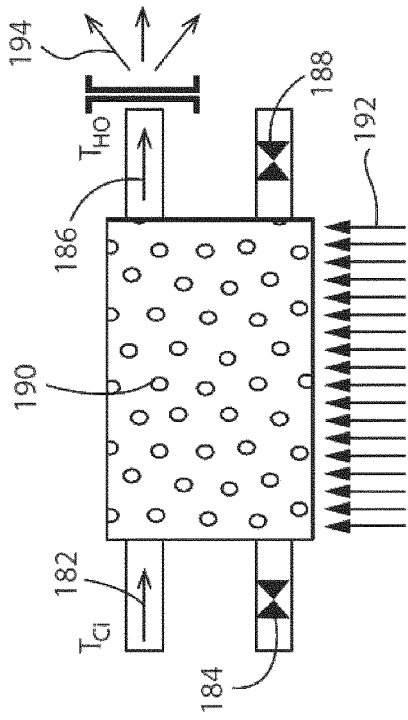
FIGS. 1A-1D show a magnetic refrigerator system using the AMR cycle.
Figure 1B:
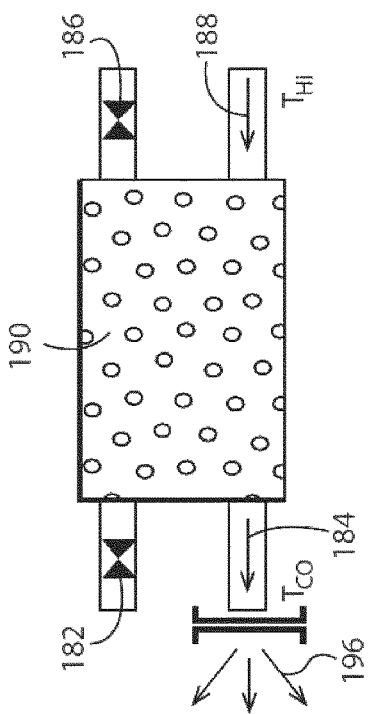
Figure 1C:
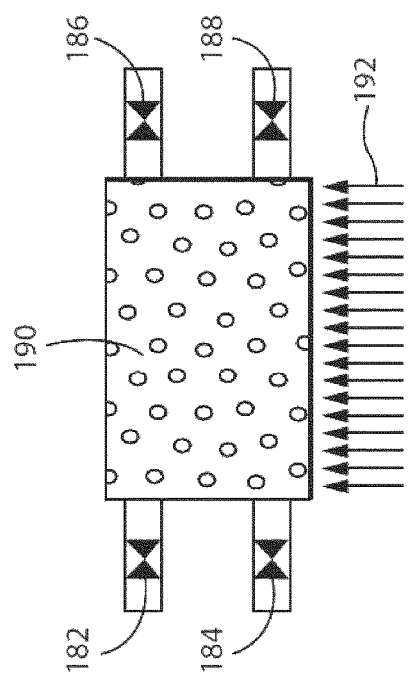
Figure 1D:
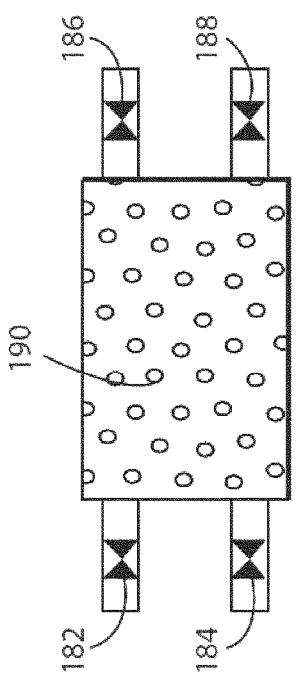

Modern room-temperature MR systems implement the so-called Active Magnetic Regenerator (AMR) cycle to perform cooling, as disclosed in U.S. Pat. No. 4,332,135. This cycle has four stages, as shown schematically in FIG. 1. The MR system in this figure includes a porous bed of magnetocaloric material (MCM) 190 and a heat transfer fluid, which exchanges heat with the MCM as it flows through the bed. The left side of the bed is the cold side, while the hot side is on the right (alternatively, the orientation may be different). The timing and direction (hot-to-cold or cold-to-hot) of the fluid flow is coordinated with the application and removal of a magnetic field 192. In the first stage of the cycle ("magnetization"), FIG. 1A, while the fluid in the bed 190 is stagnant, a magnetic field 192 is applied to the MCM, causing it to heat. In the next stage (the "hot blow"), FIG. 1B, while the magnetic field 192 over the bed is maintained, fluid at a temperature $T_{Ci}$ (the cold inlet temperature) is pumped via the cold inlet 182 through the bed 190 from the cold side to the hot side. This fluid pulls heat from the MCM in the bed and rises in temperature as it passes through the bed. During the hot blow, the fluid exits the bed at the temperature $T_{Ho}$ (the hot outlet temperature) via a hot outlet 186 and is circulated through a heat exchanger 194, where it gives up heat to the ambient environment and returns to the temperature $T_{Hi}$ (the hot inlet temperature)<$T_{Ho}$. In the next stage ("demagnetization"), FIG. 1C, the fluid flow is terminated and the magnetic field is removed. This causes the bed 190 to cool further. In the final stage (the "cold blow"), FIG. 1D, fluid at a temperature $T_{Hi}$ is pumped through the bed via a hot inlet 188 from the hot side to the cold side in the continued absence of the magnetic field. The fluid is cooled as it passes through the MCM in the bed 190, reaching a temperature $T_{Co}$ (the cold outlet temperature)<$T_{Ci}$. The colder fluid exiting the bed via a cold outlet 184 during the cold blow is circulated through a cold-side heat exchanger 196, picking up heat from the refrigerated environment and allowing it to maintain its colder temperature. The fluid exits the cold-side heat exchanger 196 at temperature $T_{Ci}$ and completes the AMR cycle. The cooling power $Q_C$ of the MR system can be represented by Equation 1 below:

$$Q_C=(T_{Ci}-T_{Co})\rho C\Phi_C \quad \text{Equation 1:}$$

The heat $Q_H$ exhausted to the warm ambient environment can be represented by Equation 2 below:

$$Q_H(T_{Ho}-T_{Hi})\rho C\Phi_H \quad \text{Equation 2:}$$

where $\rho$ is the density of the heat transfer fluid, C is its heat capacity, and $\Phi_H$, $\Phi_C$ are the average volumetric flow rates through the system during the hot and cold blows, respectively. The symbols $\Delta t_H$ and $\Delta t_C$ are used herein to denote the durations of the hot and cold blows, respectively. The time required for execution of the four stages of the AMR cycle is called the cycle period and its inverse is known as the cycle frequency. The temperature span of the MR system is defined as the difference between the inlet fluid temperatures: $T_{Hi}-T_{Ci}$.

FIG. 1 illustrates the operation of a single-bed MR system. In an alternative embodiment, multiple beds, each undergoing the same AMR cycle, may be combined in a single system to increase the cooling power, reduce the system size, or otherwise improve the performance of the cycle.

To implement the AMR cycle, a magnetic refrigerator utilizes one or more porous beds of MCM, a heat transfer fluid, a pump to drive the fluid through the beds, a process for applying and removing a magnetic field to the beds, and a flow control system which coordinates the timing and direction of the fluid flow through a bed with the application and removal of the magnetic field over the bed. In one implementation of the AMR cycle in a magnetic refrigerator, a wheel formed from separate, identical beds is rotated through a gap in a permanent magnet assembly. In this arrangement, the magnetic field is applied to a given bed as it enters the gap in the magnet assembly, the field is maintained while the bed rotates through the gap, and the field over the bed is removed as the bed rotates out of the gap. The bed experiences no magnetic field while it is outside of the gap of the magnet assembly. This arrangement, referred to as a "rotating bed" magnetic refrigerator or RBMR, is described in U.S. Pat. No. 6,526,759.

In a second implementation of the AMR cycle in a magnetic refrigerator, a magnet assembly with a gap rotates over fixed beds of MCM. The magnetic field is applied to a given bed when the magnet assembly rotates over it. The field is maintained over the bed as it remains within the magnet gap. As the magnet rotates away from the given bed, the magnetic field is removed. This arrangement, referred to as a rotating magnet magnetic refrigerator or RMMR, is described in U.S. Pat. No. 6,668,560.

Typically, a magnetic field of 1-2 Tesla is utilized to effectively exploit the magnetocaloric effect for commercially relevant refrigeration. This field is usually provided by an assembly of powerful NdFeB magnets along with elements (such as soft iron) with high magnetic permeability that guide the magnetic flux in a desired pattern. One type of magnet assembly used in magnetic refrigeration systems is the modified Halbach array, described in U.S. Pat. No. 6,946,941. This assembly is designed to produce a large field over an arc-shaped region, appropriate for rotating architectures. Because of their use of the rare-earth elements Nd and Dy, NdFeB magnets are expensive, and the cost of a magnetic refrigeration system is dominated by the cost of the NdFeB magnets it uses. Consequently, to be commercially viable, a magnetic refrigeration system should use the absolute minimum mass of NdFeB.

Figure 2A:
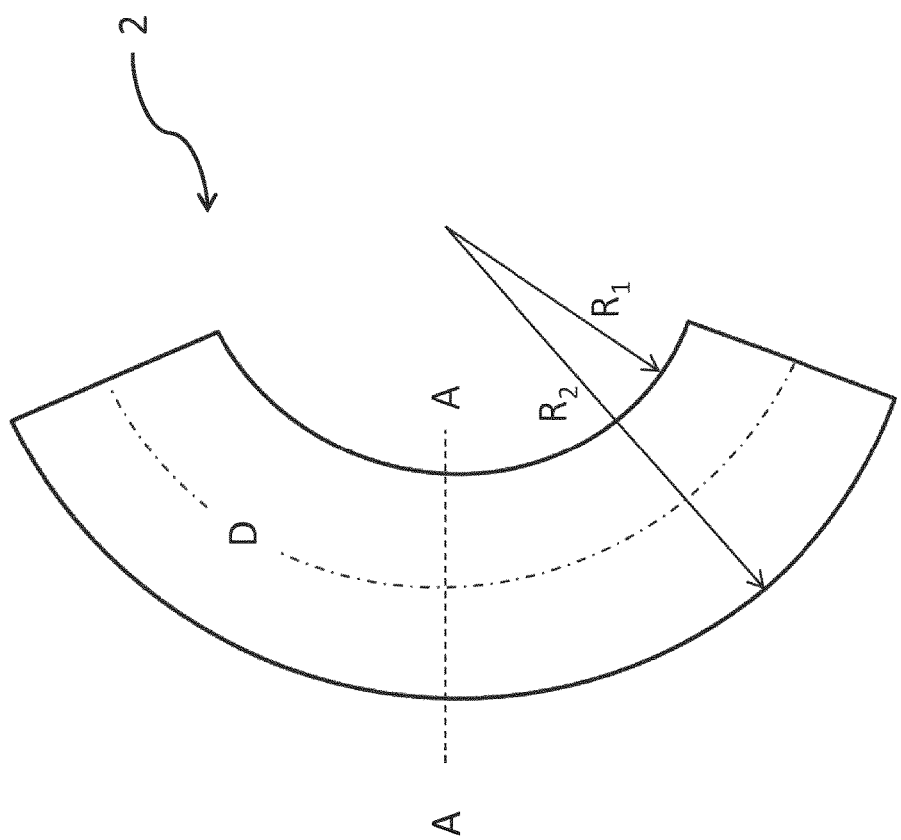
FIGS. 2A (plan view) and 2B (cross section taken at A-A from 2A) illustrate parameters that can be used to characterize gap volume in the shape of a partial annulus in accordance with an illustrative embodiment.

In a magnetic refrigeration system that employs relative rotation between beds and the magnet gap to apply and remove a magnetic field to the beds, such as an RBMR or RMMR, the magnet assembly is designed to produce a high magnetic field in the gap volume, into which the beds housing the magnetocaloric material are placed. In an illustrative embodiment, this gap volume 2 is in the shape of a partial annulus and can be characterized by four parameters as shown in FIGS. 2a (plan view) and 2b (cross section at line A-A shown in 2a): the gap height H, the inner gap radius $R_1$, the outer gap radius $R_2$, and the gap angular extent D (measured in degrees). Given these parameters, the volume of the high-field region 2 can be represented by Equation 3:

$$V_{hf} = H\pi(R_2^2 - R_1^2)\frac{D}{360°}.$$ Equation 3

The NdFeB mass needed to maintain a desired field strength in the high-field volume 2 increases as this volume increases. Therefore, to minimize the NdFeB mass required by the magnet assembly, the high-field volume 2 can be minimized. The subject matter described herein reduces the volume of the high-field region 2 by reducing its angular extent D. This action by itself, however, will decrease the cooling power that can be obtained from a bed (for reasons to be described below), requiring a growth in bed size to meet a desired cooling power target for the MR system. This growth in bed size, in turn, involves a growth in gap height H or gap radial gap depth $R_2-R_1$ to accommodate the larger bed (or beds). The subject matter of the present application combines the reduction in angular extent of the high-field region with the use of hot and cold blows of unequal durations and unequal flow rates to minimize the decrease in cooling power and the growth in bed size. With unequal durations and flow rates for the hot and cold blows, the reduction in gap volume 2 associated with the decrease in D more than compensates for the increase in H and radial gap depth necessitated by the larger beds, and thereby leads to a net reduction in the gap volume 2 and in the NdFeB mass of the magnet assembly.

In a magnetic refrigeration system with relative rotation between the magnet assembly and the beds, a bed will be magnetized for a time duration $\Delta t_M = D/\omega$, where $\omega$ is the relative rotation rate (in degrees per second) between the beds and magnet assembly. The hot blow is performed while the bed is magnetized, and if the hot blow duration $\Delta t_H$ exceeds $\Delta t_M$, cold-to-hot fluid flow is performed while the bed is cold (demagnetized). This will waste some of the cooling power of the cold (demagnetized) bed, which is only obtained from hot-to-cold fluid flow. On the other hand, if $\Delta t_H$ is smaller than $\Delta t_M$, some of the time available for heat removal from the magnetocaloric material will not be utilized. In this case, some of the heat generated in the magnetized bed from the magnetocaloric effect may not be completely exhausted, and the bed will remain warmer than necessary and will therefore not provide as much cooling power when the field is removed. Thus, in a properly-designed magnetic refrigeration system, it is expected that that $\Delta t_H \approx \Delta t_M = D/\omega$.

All magnetic refrigeration systems to date employ equal blow durations, where $\Delta t_H = \Delta t_C$. Because magnetic refrigerators use a closed fluid circulation system, fluid mass conservation dictates that the flow rates during the blows must be equal as well: $\Phi_H = \Phi_C$. For purposes of the present application, a system with equal blow durations and rates is referred to as an "equal-blows" system. For such systems, it is clear that maximum cooling power will be obtained with the largest possible value of D, which is approximately 180 degrees. If D decreases below this maximum, then the hot blow duration will decrease and because the blows have equal duration, the cold blow duration will also decrease. The system will therefore have an increased time between blows (referred to as dwell time), where no flow is occurring. In the absence of flow, the MR system cannot exhaust heat or harvest cooling power, so system performance suffers as the dwell time increases. For this reason, the performance of equal-blows systems favors magnet assemblies with large angular extents. It is also noted that it is relatively straightforward to implement flow control and plumbing in an equal-blows system, particularly in systems with only a few beds.

To illustrate these points quantitatively, a theoretical model of an equal-blows magnetic refrigeration system can be used, such as that described in K. Engelbrecht, "A Numerical Model of an Active Magnetic Regenerator Refrigerator with Experimental Validation", Ph.D. Thesis, University of Wisconsin-Madison (2008). Such models are known to accurately predict magnetic refrigeration system performance. This model can be used to obtain the minimum bed volume necessary to meet a desired target cooling power as a function of the angular extent D of the high-field region produced by the magnet assembly.

To evaluate the performance of a magnetic refrigeration system, all of the parameters which define its operating conditions, bed geometry, bed composition, and field shape, along with the properties of the heat transfer fluid should be specified. These parameters include the refrigeration cycle frequency, the angular extent of the high-field region, the peak field in the high-field region, the flow rates, durations, and starting times of the hot and cold blows, the position of a bed relative to the magnet at the start of the cycle, the particle size and packing porosity of the MCM in the beds, and the properties (heat capacity, density, thermal conductivity, entropy) of this MCM. In addition, to improved performance, a bed will in general contain a number of layers of MCM with different properties, and the properties of these layers (e.g., their Curie temperature and thickness) should also be specified. The evaluation of the minimum bed volume required to meet a specific cooling power target for a given value of D therefore represents an optimization problem in which the parameters defining the system can be systematically varied until values are found which minimize the bed volume. In addition, the optimization process should also ensure that the system produces the desired cooling power, along with other performance constraints that are desired. As an example, a magnetic refrigeration system can be designed to provide 3500 W of cooling power over a temperature span of 24.7 C with Coefficient of Performance (COP)=4. The COP, which is a commonly used measure of the energy-efficiency of a refrigeration system, is the ratio of the cooling power delivered by the system to the total electrical power consumption of the system. The performance targets used in this example are typical for a high-efficiency household air-conditioning system. The average field over the gap volume can be fixed at 1.5 tesla. Also, the system can use 12 identical beds (each bed producing ¹⁄₁₂ of the total 3500 W of cooling power), with each bed having 14 layers of MCM.

Figure 3:
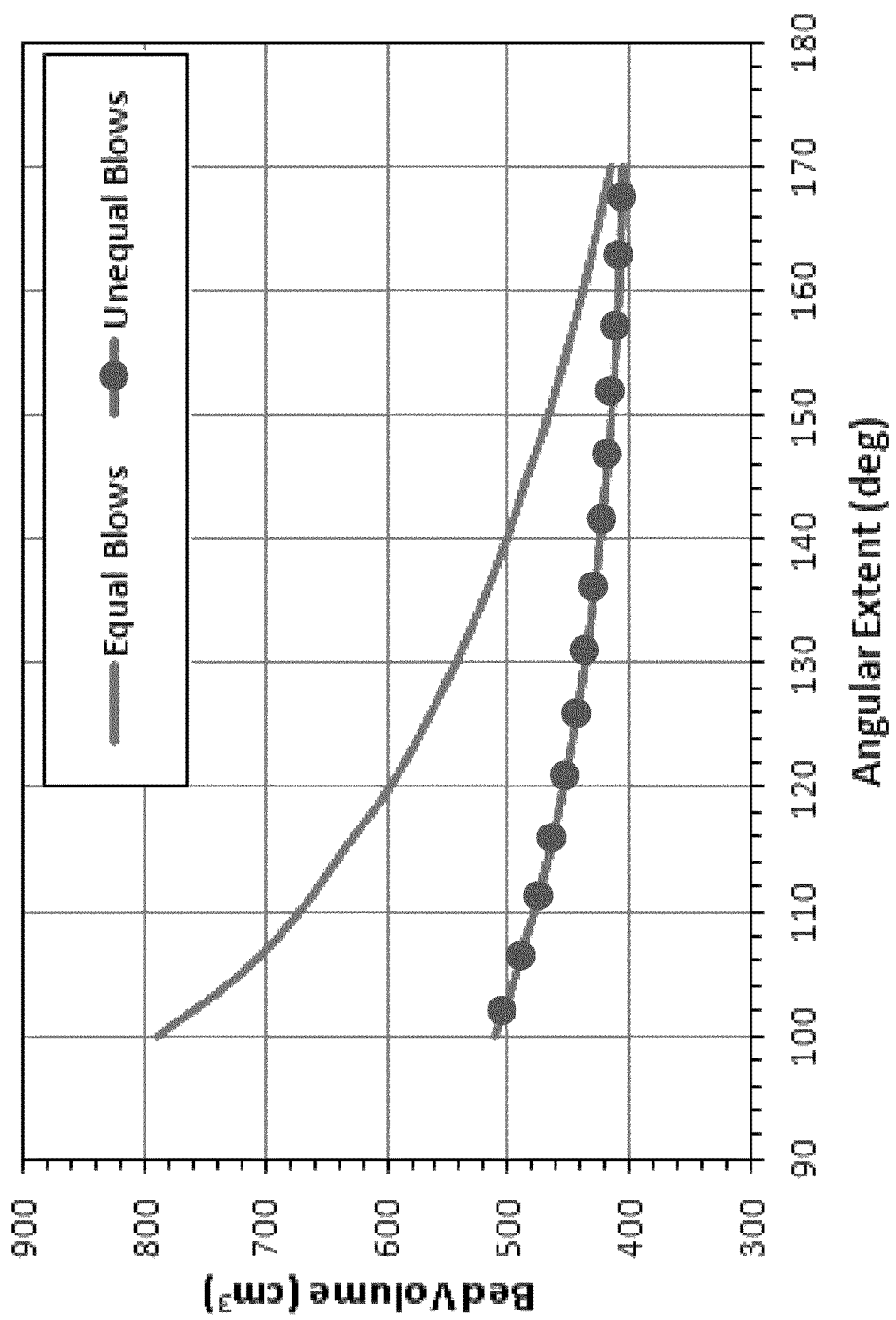
FIG. 3 illustrates the minimum bed volume of an equal-blows system and of an unequal-blows system as a function of the angular extent of the high-field region of the magnet assembly in accordance with an illustrative embodiment.

FIG. 3 illustrates the minimum bed volume (that is, the minimum combined volume of all of the 12 identical beds in the system) that this equal-blows system requires as a function of the angular extent of the high-field region of the magnet assembly (upper curve). This minimum bed volume can obtained with the use of an automated numerical optimization process, which is discussed, for example, in P. Gill, W. Murray, and M. Wright, Practical Optimization, Academic Press (1981).

The present inventors have determined that as the angular extent of the high-field region increases, more cooling power can be obtained out of a given bed volume, so the minimum bed volume needed to meet a cooling power target of 3500 W decreases as the angular extent of the high-field region increases. This decrease is significant: for the example considered here, the required bed volume drops by a factor of two as the angular extent changes from 100 degrees to 170 degrees.

As noted above, in the equal-blows case, as the angular extent of the high-field region decreases, the duration of the hot blow $\Delta t_H$ also decreases, resulting in less time to exhaust all the heat generated in the bed from the application of the magnetic field. Suppose, however, that the example above is modified by reducing the angular extent of the magnet, reducing the hot blow duration, removing the equal-blows restriction, and attempting to compensate for the reduced duration of the hot blow by increasing the flow rate during this reduced hot blow duration, without (for the moment) changing the duration or flow rate of the cold blow. These modifications will have two effects. First, the surface heat transfer coefficient between the heat transfer fluid and the solid particles of MCM in the bed, which is generally an increasing function of flow rate, will become larger in the hot blow so that the fluid will be able to extract more heat from the MCM. Second, the increased volume of fluid passing through the bed will be able to carry more heat away. The increase in flow rate during the hot blow should therefore allow the hot blow to be more effective, increasing the heat exhaust from the magnetized bed and allowing the bed to be colder when the field is removed. This should mitigate, to an extent, the reduction in cooling performance associated with the reduced hot blow duration (associated, in turn, with the reduced angular extent of the high-field region).

Because a magnetic refrigerator employs a closed fluid circulation system, the amount of heat transfer fluid sent through a bed during the hot blow must equal the amount of fluid sent through the bed during the cold blow, so the flow rates and durations of the blows must satisfy the relation set forth in Equation 4 below:

$$\Delta t_H \Phi_H = \Delta t_C \Phi_C. \quad \text{Equation 4:}$$

When the hot blow duration is decreased and the hot blow flow rate increased, the cold blow duration and flow rate could be left at their equal-blows value. This, however, would leave an unnecessarily long dwell time between the blows, which wastes a portion of the refrigeration cycle. When the high-field region has reduced angular extent, a bed will be cold (demagnetized) for a longer duration. This extra time can be taken advantage of by increasing the duration $\Delta t_C$ of the cold blow, which would provide more time for harvesting the cooling power of the cycle. In this case, to satisfy Equation 4 the flow rate during the cold blow could be decreased. Reducing the flow rate would have the additional (although usually small) benefit of reducing viscous dissipation during the cold blow, when the viscosity of the heat transfer fluid is largest.

From these general considerations, the present inventors propose that by introducing unequal blows (where the hot blow duration decreases, the cold blow duration increases, the hot blow flow rate increases, and the cold blow flow rate decreases), all in a manner that satisfies Equation 4, some of the loss in cooling power that is associated with a decrease in the angular extent of the high-field region in the equal-blows case can be recovered. This loss in cooling power in the equal-blows case was demonstrated by the upper curve in FIG. 3, where the minimum bed volume utilized to produce 3500 W of cooling power had to grow as the angular extent of the high-field region was reduced.

To verify this expectation, theoretical modeling can be applied to the example considered above of a magnetic refrigeration system constrained to provide 3500 W of cooling power over a span of 24.7 C with COP=4. Specifically, the minimum bed volume to meet these performance conditions can be determined by dropping the equal-blows restriction and allowing the durations and flow rates of the two blows to vary independently, subject only to the constraint of Equation 4. The minimum bed volume needed to meet the system performance requirements in this unequal-blows case is shown as the bottom curve in FIG. 3. At 170 degrees, unequal blows offer only a slight advantage over equal blows, but this advantage grows rapidly as the angular extent decreases. Also, as expected, the use of unequal blows produces a significant improvement in performance relative to the equal-blows case as the angular extent of the high-field region is decreased. With an angular extent of 100 degrees, for example, the use of unequal blows requires a bed volume of only 500 cm$^3$, while a bed volume of 800 cm$^3$ is required when the equal-blows restriction is enforced.

Figure 4:
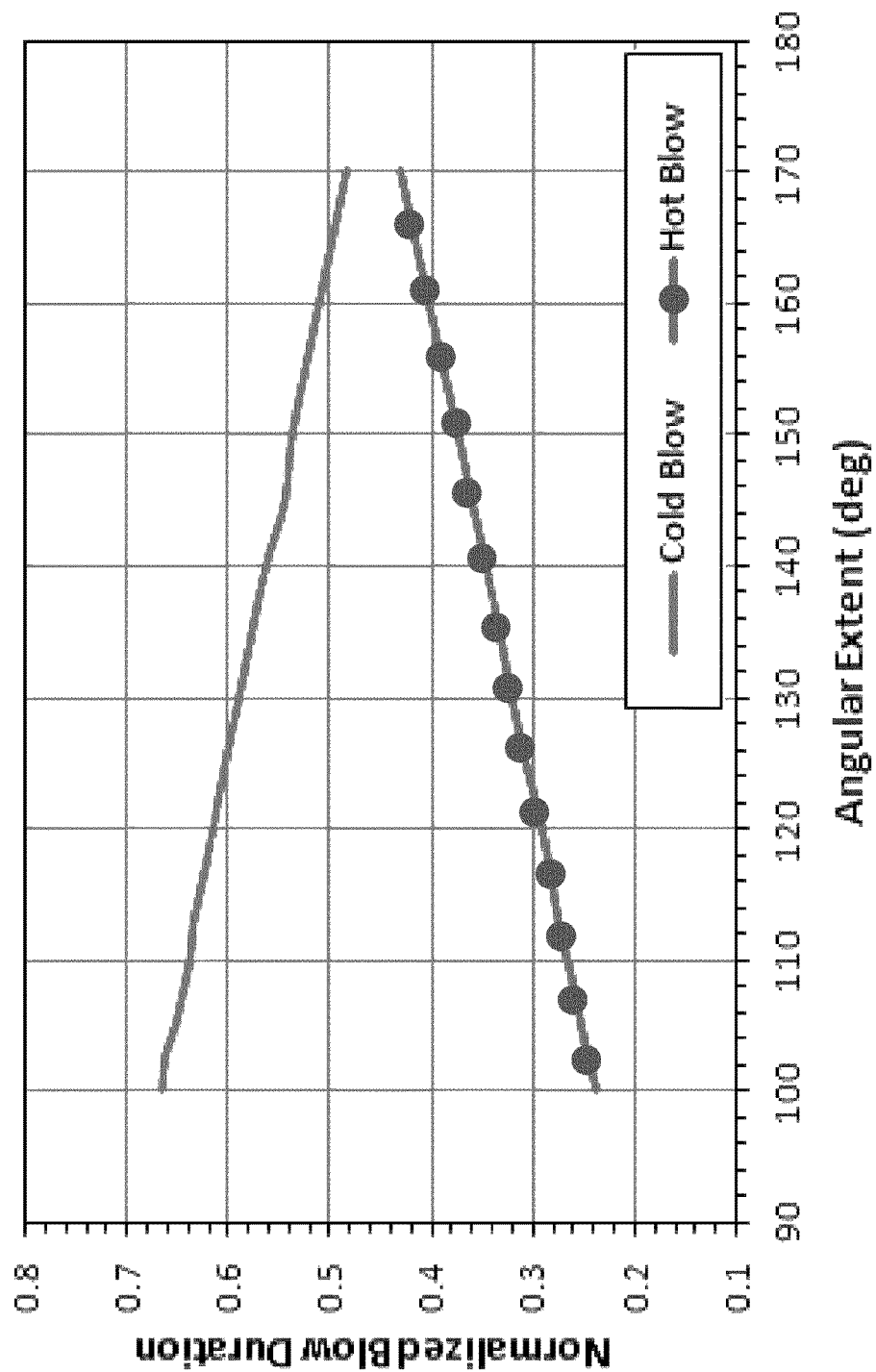
FIG. 4 illustrates optimized hot and cold blow durations for a 3500 W system obtained from an unequal-blows optimization process as a function of the angular extent of the high-field region in accordance with an illustrative embodiment.
Figure 5:
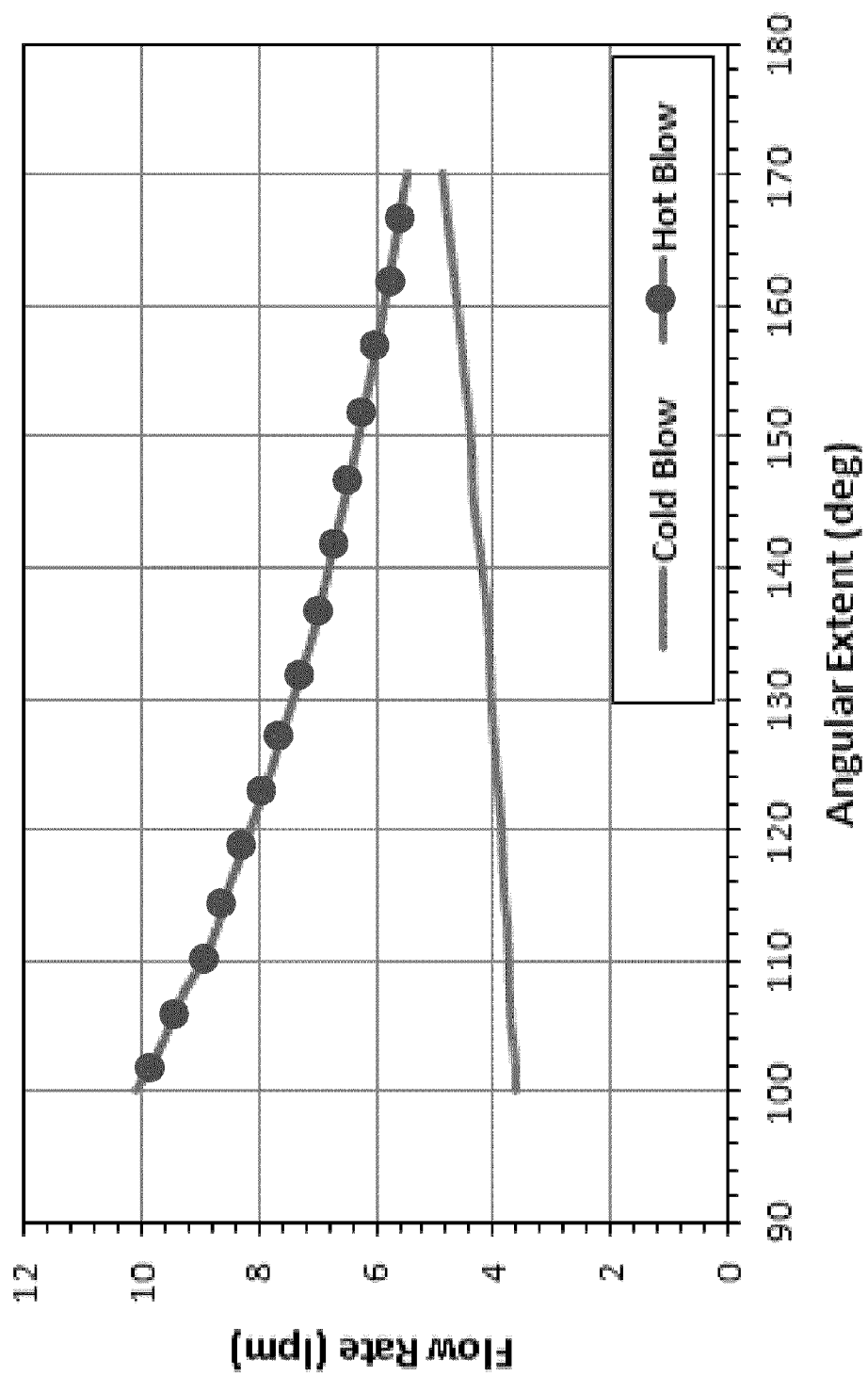
FIG. 5 illustrates hot and cold blow flow rates obtained from the optimization process in accordance with an illustrative embodiment.

FIG. 4 illustrates the optimized hot and cold blow durations for the 3500 W system obtained from the unequal-blows optimization process as a function of the angular extent D of the high-field region. The blow durations have been normalized by dividing by the cycle period. FIG. 5 illustrates the hot and cold blow flow rates obtained from the optimization process as functions of D. As expected from the general considerations above, the optimized hot blow duration decreases and the flow rate increases as the angular extent decreases, while the cold blow duration increases and the flow rate decreases.

To be commercially viable, a MR system should use the smallest possible amount of NdFeB, which in general is obtained by minimizing the gap volume given by Equation 3. This gap volume is proportional to the angular extent D, and it is considered what happens in FIG. 3 as D is decreased. As the angular extent decreases, the bed volume needed to meet the system performance requirements in either the equal-blows case (upper curve) or unequal-blows case (lower curve) increases and to accommodate the larger bed volume, the gap height H, the radial gap depth $R_2-R_1$, or both can be increased. The term $H\pi(R_2^2-R_1^2)$ in Equation 3 will therefore increase. If the fractional increase in this term is less than the fractional decrease in D, then the gap volume will decrease as a result of decreasing D. In this case, the NdFeB mass can be reduced by reducing the angular extent of the high-field region, even though this would result in an increase in bed volume. With respect to FIG. 3, it is thus apparent that when unequal blows are employed, the rate of growth of the bed volume with decreasing angular extent is much smaller than with equal blows. For example, with equal blows, decreasing the angular extent from 170 degrees to 140 degrees causes the bed volume to increase by 21%. With unequal blows, the bed volume increases by only 4%. This means that with unequal blows, a decrease in angular extent should be compensated by a much smaller increase in the gap height or radial depth than would be necessary with equal blows. Therefore, with unequal blows an even greater reduction in overall gap volume and NdFeB mass can be achieved by reducing the angular extent of the high-field region. Indeed, with equal blows it is not clear that any reduction in gap volume would be obtained by a reduction in the angular extent. The subject matter disclosed herein therefore involves a magnetic refrigeration system employing relative rotation between a magnet assembly and one or more beds where the duration of the hot blow is proportional to the angular extent of the high-field region, and where unequal hot and cold blow durations and flow rates, limited by Equation 4, are combined with a reduction in the angular extent of the high-field region to reduce the gap volume and therefore the NdFeB mass in the magnet assembly.

To demonstrate the significant reduction in NdFeB mass that is possible by reduction of angular extent combined with unequal blows, commercial magnet simulation software was used to design a magnet assembly in the form of a modified Halbach array for several angular extents along the unequal-blows curve in FIG. 3. FIG. 18 includes a table illustrating calculated NdFeB masses for a system optimized for different angular extents of the high-field region. For all these designs, the gap height H was kept fixed at 26.4 mm. Alternatively, a different gap height may be used.

It can be seen that with unequal blows, reducing the angular extent of the high-field region from 160 degrees to 110 degrees has reduced the computed NdFeB mass from 56.7 kg to 42.4 kg, a mass reduction of 25%. While the numerical values of the reductions in NdFeB mass in FIG. 18 apply only for the specific MR system and modified Halbach magnet assembly considered here, the general principles on the performance of an MR system with a reduced angular extent and unequal blows presented above suggest that the present subject matter will lead generally to a reduction in the gap volume and the NdFeB mass required by the magnet assembly.

The First Embodiment

In a first embodiment, a magnetic refrigeration system in the RMMR configuration, uses four valves and two identical linear displacers to provide unequal hot and cold blow durations and flow rates. The valves and linear displacers are controlled by a programmable microprocessor. The heat transfer fluid is assumed to be a relatively incompressible liquid such as water. Alternatively, a different heat transfer fluid may be used. The first embodiment (FIGS. 6a and 6b) employs a single, fixed bed 30 of magnetocaloric material. The bed 30 has four fluid ports, a cold inlet port (Ci) 32, a cold outlet port (Co) 34, a hot inlet port (Hi) 36, and a hot outlet port (Ho) 38.

Figure 2B:
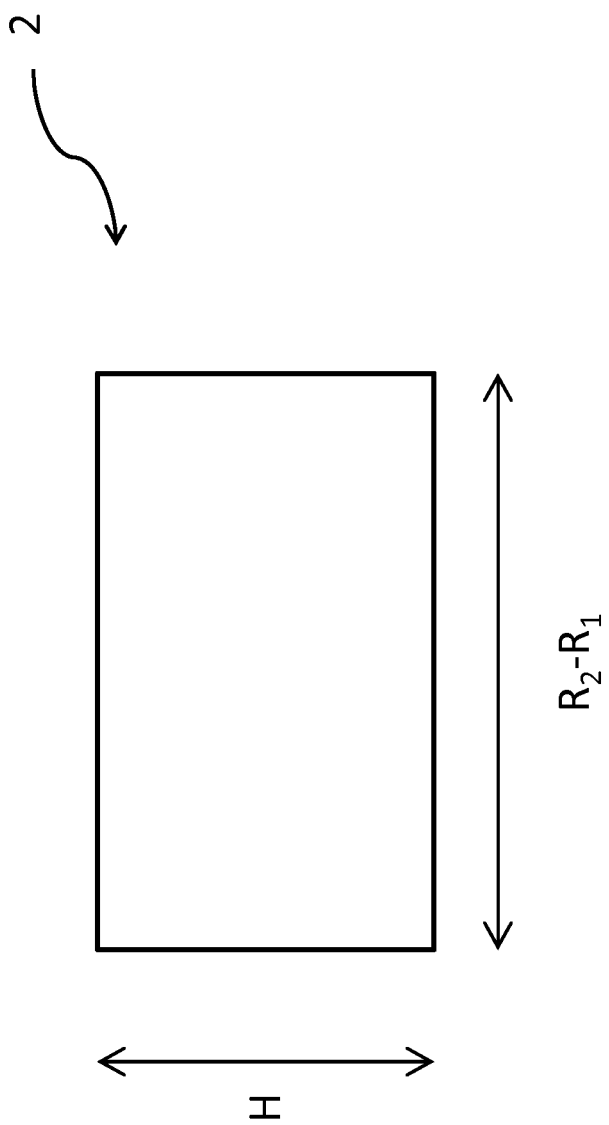

This embodiment employs a rotating magnet assembly with a gap that is a portion of an annulus, as illustrated in FIG. 2. Within this gap, the magnet assembly produces a high magnetic field. The fixed bed and the magnet gap are arranged so that the bed fits inside the gap as the magnet assembly rotates over the bed. During operation as a magnetic refrigerator, the bed becomes magnetized when the magnet assembly rotates over the bed and the bed enters the gap. When the magnet assembly rotates away from the bed, it becomes demagnetized. The flow in the system is configured so that during the hot blow stage of the refrigeration cycle, which occurs when the bed is magnetized (i.e., when it is within the gap of the magnet assembly), flow proceeds through the bed from its cold inlet port to its hot outlet port, and during the cold blow stage of the refrigeration cycle, when the bed is demagnetized (i.e., when it is completely outside of the gap of the magnet assembly), flow proceeds through the bed from its hot inlet port to its cold outlet port. A schematic view of this embodiment is provided in FIGS. 6a and 6b.

Figure 6A:
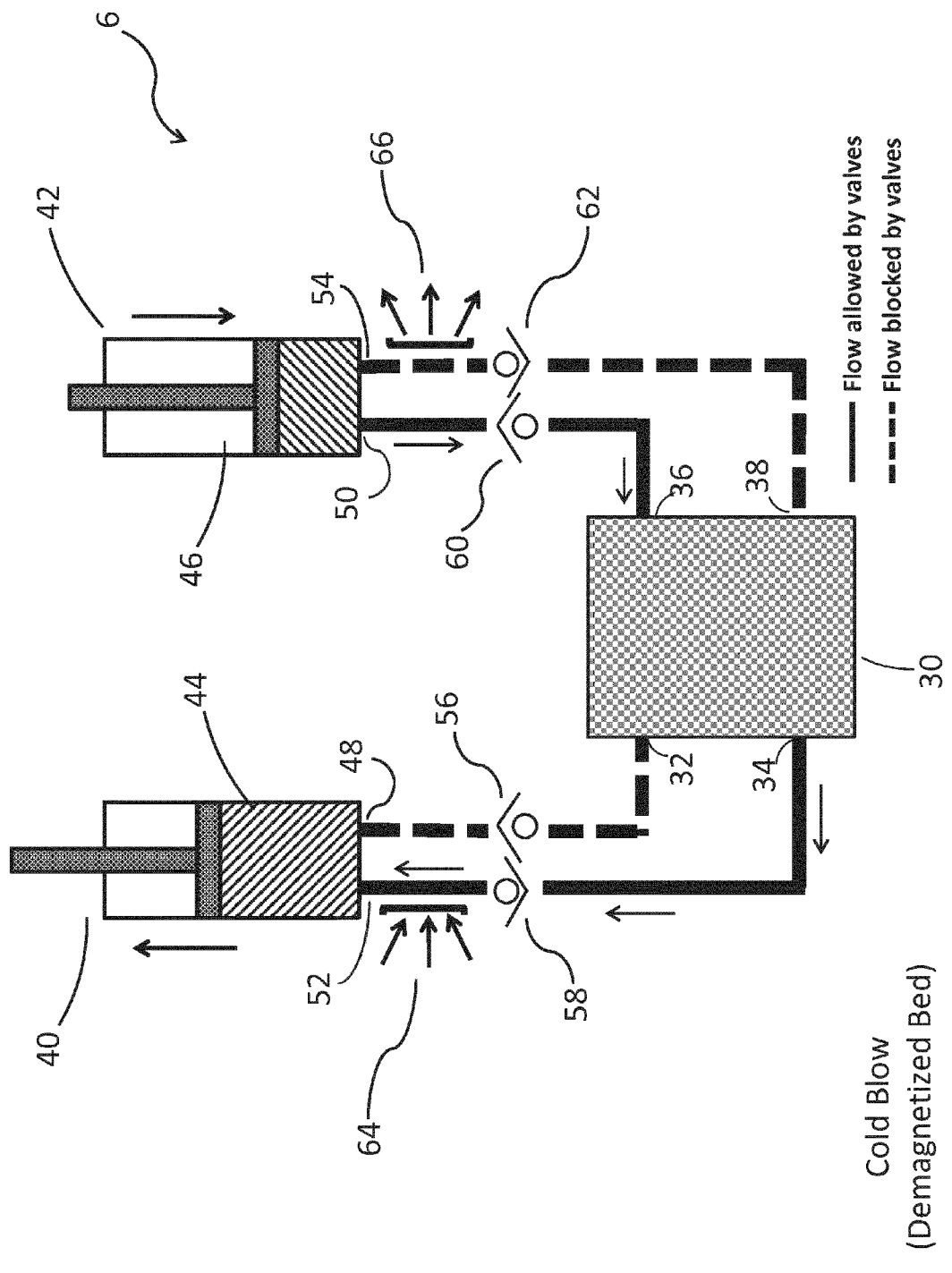

Flow through the system is provided by two identical linear displacers, one for the cold side 40, and one for the hot side 42, shown at the top of FIGS. 6a and 6b. Each displacer has a fluid volume compartment 44 and 46 with cross-sectional area A and displacement length L such that the fluid displacement volume A×L is equal to the common hot and cold blow volume, illustrated in Equation 5 below:

$$A \times L = \Delta t_H \Phi_H = \Delta t_C \Phi_C.$$ Equation 5:

The linear displacers are driven by two separate motors (for example, stepper motors) that are not shown in the figures. Each linear displacer has an output port 48 and 50 where fluid emerges under pressure from the displacer and an input port 52 and 54 through which fluid can fill the fluid chamber of the displacer. Unidirectional flow through the input and output ports could be established, for example, by check valves, or by microprocessor-controlled valves.

First consider a system 6 with four check valves, two on the cold side 56 and 58 and two on the hot side 60 and 62, as shown in FIGS. 6a and 6b. On the cold side, the cold inlet check valve 56 allows flow to the cold inlet port 32 of the bed 30 while the cold outlet check valve 58 allows flow from the cold outlet port 34 of the bed 30. On the hot side, the hot inlet check valve 60 allows flow to the hot inlet port 36 of the bed 30 while the hot outlet check valve 62 allows flow from the hot outlet port 38 of the bed 30. Finally, the system 6 has two heat exchangers 64 and 66, one on the cold side (CHEX) 64 that absorbs heat from the environment to be refrigerated and one on the hot side (HHEX) 66 that exhausts heat to a warmer ambient environment.

The system 6 operation during the cold blow, when the bed 30 is demagnetized, is illustrated in FIG. 6a. At the start of the cold blow, the fluid chamber 46 of the hot-side linear displacer 42, which drives the flow during this stage of the refrigeration cycle, is filled with fluid at temperature $T_{Hi}$. The motor for the hot side linear displacer is controlled by the microprocessor so that the displacer is driven the total displacement length L over the desired duration $\Delta t_C$ of the cold blow. That is, the motor drives the hot-side linear displacer with an approximately constant speed as indicated by Equation 6 below:

$$v_C = L/\Delta t_C.$$ Equation 6:

During the cold blow, the hot inlet check valve 60 directs the flow driven by the displacer to the hot inlet port 36 of the demagnetized bed 30. The hot outlet check valve 62, during the cold blow, blocks flow to the hot outlet port 38 of the bed 30. The cold outlet check valve 58 allows flow to proceed from the cold outlet port 34 of the bed 30 to the cold-side heat exchanger 64. The cold inlet check valve 56, during the cold blow, blocks flow from the cold inlet port 32 of the bed 30.

The fluid from the hot-side linear displacer 42 is cooled as it passes through the bed 30 from the hot inlet port 36 to the cold outlet port 34 and gives up heat to the cold, demagnetized MCM in the bed. This fluid emerges at the cold outlet port 34 with temperature $T_{Co}$ and passes through the cold outlet check valve 58 to the cold-side heat exchanger 64, where it absorbs heat from the refrigerated environment, allowing this environment to maintain its colder temperature. The fluid exits the cold-side heat exchanger 64 at temperature $T_{Ci}$ and fills the fluid chamber 44 of the cold-side linear displacer 40.

After the completion of the cold blow (i.e., after a time interval $\Delta t_C$), the magnet rotates over the bed, and the MCM in the bed heats up from the magnetocaloric effect. At this point, the hot blow stage of the refrigeration cycle, illustrated in FIG. 6b, begins. The cold-side linear displacer 40, filled with fluid at temperature $T_{Ci}$ from the previous cold blow, drives the flow during the hot blow. The motor for the cold-side linear displacer is controlled by the microprocessor so that the displacer is driven the total displacement length L over the desired duration $\Delta t_H$ of the hot blow. That is, the motor drives the cold-side linear displacer with an approximately constant speed as indicated by Equation 7 below:

$$v_H = L/\Delta t_H.$$ Equation 7:

During the hot blow, the cold inlet check valve 56 allows fluid from the displacer 40 to pass to the cold inlet port 32 of the magnetized bed 30. The cold outlet check valve 58 blocks flow to the cold outlet port 34 of the bed 30. The hot outlet check valve 62 allows flow to proceed from the hot outlet port 38 of the bed 30 to the hot-side heat exchanger 66. Finally, the hot inlet check valve 60 blocks flow from the hot inlet port 36. The fluid from the cold-side linear displacer 40 gains heat from the hot, magnetized magnetocaloric material and rises in temperature as it passes through the bed 30 from the cold inlet port 32 to the hot outlet port 38. This fluid emerges at the hot outlet port 38 with temperature $T_{Ho}$ and passes through the hot outlet check valve 62 to the hot-side heat exchanger 66. In the heat exchanger 66, the fluid exhausts heat to the ambient environment. The fluid exits the hot-side heat exchanger 66 at temperature $T_{Hi}$ and fills the fluid chamber 46 of the hot-side linear displacer 42, completing the refrigeration cycle. This fluid is now available for the cold blow stage of the next refrigeration cycle.

An alternate arrangement of the system has four controlled valves, two on the cold side and two on the hot side, as shown in FIGS. 7a and 7b. On the cold side, the cold inlet valve 76 controls flow to the cold inlet port 32 of the bed 30 while the cold outlet valve 78 controls flow to the cold outlet port 34 of the bed 30. On the hot side, the hot inlet valve 80 controls flow to the hot inlet port 36 of the bed while the hot outlet valve 82 controls flow to the hot outlet port 38 of the bed 30. Finally, the system 7 has two heat exchangers, one on the cold side 64 (CHEX) that absorbs heat from the environment to be refrigerated and one on the hot side 66 (HHEX) that exhausts heat to a warmer ambient environment.

The system operation during the cold blow, when the bed is demagnetized, is illustrated in FIG. 7a. At the start of the cold blow, the fluid chamber 46 of the hot-side linear displacer 42, which drives the flow during this stage of the refrigeration cycle, is filled with fluid at temperature $T_{Hi}$. The motor for the hot side linear displacer is controlled by the microprocessor so that the displacer is driven the total displacement length L over the desired duration $\Delta t_C$ of the cold blow. That is, the motor drives the hot-side linear displacer with an approximately constant speed given by Equation 6.

During the cold blow, the microprocessor opens the hot inlet valve 80, so that the flow driven by the displacer 42 is allowed to proceed through the hot inlet valve 80 to the hot inlet port 36 of the demagnetized bed 30. The microprocessor simultaneously closes the hot outlet valve 82 during the cold blow, blocking flow to or from the hot outlet port 38 of the bed 30. The microprocessor opens the cold outlet valve 78 to allow flow to proceed from the cold outlet port 34 of the bed 30 to the cold-side heat exchanger 64. The microprocessor closes the cold inlet valve 76 during the cold blow, blocking flow to or from the cold inlet port 32 of the bed 30.

The fluid from the hot-side linear displacer 42 is cooled as it passes through the bed 30 from the hot inlet port 36 to the cold outlet port 34 and gives up heat to the cold, demagnetized MCM in the bed 30. This fluid emerges at the cold outlet port 34 with temperature $T_{Co}$ and passes through the open cold outlet valve 78 to the cold-side heat exchanger 64, where it absorbs heat from the refrigerated environment, allowing this environment to maintain its colder temperature. The fluid exits the cold-side heat exchanger 64 at temperature $T_{Ci}$ and fills the fluid chamber 44 of the cold-side linear displacer 40.

After the completion of the cold blow (i.e., after a time interval $\Delta t_C$), the magnet rotates over the bed, and the MCM in the bed heats up from the magnetocaloric effect. At this point, the hot blow stage of the refrigeration cycle, illustrated in FIG. 7b, begins. The cold-side linear displacer 40, filled with fluid at temperature $T_{Ci}$ from the previous cold blow, drives the flow during the hot blow. The motor for the cold-side linear displacer is controlled by the microprocessor so that the displacer is driven the total displacement length L over the desired duration $\Delta t_H$ of the hot blow. That is, the motor drives the cold-side linear displacer 40 with an approximately constant speed given by equation 7.

During the hot blow, the microprocessor opens the cold inlet valve 76, allowing fluid from the displacer to pass through the cold inlet valve 76 and proceed to the cold inlet port 32 of the magnetized bed 30. The microprocessor simultaneously closes the cold outlet valve 78, blocking flow to or from the cold outlet port 34 of the bed. The microprocessor opens the hot outlet valve 82, allowing flow to proceed from the hot outlet port 38 of the bed 30 to the hot-side heat exchanger 66. Finally, the microprocessor closes the hot inlet valve 80, blocking flow to or from the hot inlet port 36. The fluid from the cold-side linear displacer 40 gains heat from the hot, magnetized magnetocaloric material and rises in temperature as it passes through the bed 30 from the cold inlet port 32 to the hot outlet port 38. This fluid emerges at the hot outlet port 38 with temperature $T_{Ho}$ and passes through the open hot outlet valve 38 to the hot-side heat exchanger 66. In the heat exchanger 66, the fluid exhausts heat to the ambient environment. The fluid exits the hot-side heat exchanger 66 at temperature $T_{Hi}$ and fills the fluid chamber 46 of the hot-side linear displacer 42, completing the refrigeration cycle. This fluid is now available for the cold blow stage of the next refrigeration cycle.

In these embodiments with either check valves or controlled valves, the average cold blow flow rate is given by $$\Phi_C = A v_C = AL/\Delta t_C$$ Equation 8:

while the average hot blow flow rate is given by $$\Phi_H = A v_H = AL/\Delta t_H$$ Equation 9:

From equations 8 and 9, one can see that for any choice of the cold and hot blow durations, the flow rate condition of Equation 5 will be satisfied. Once these durations are chosen, any desired hot and cold blow flow rates can be obtained by appropriate choice of the displacer parameters A and L.

The two displacers 40 and 42, one on the cold side, and the other on the hot side, could be replaced by one double-acting displacer with a cold side and a hot side. In this case, the displacer piston could be driven at different speeds when moving in the two different directions in order to implement unequal blow durations and rates.

Figure 8:
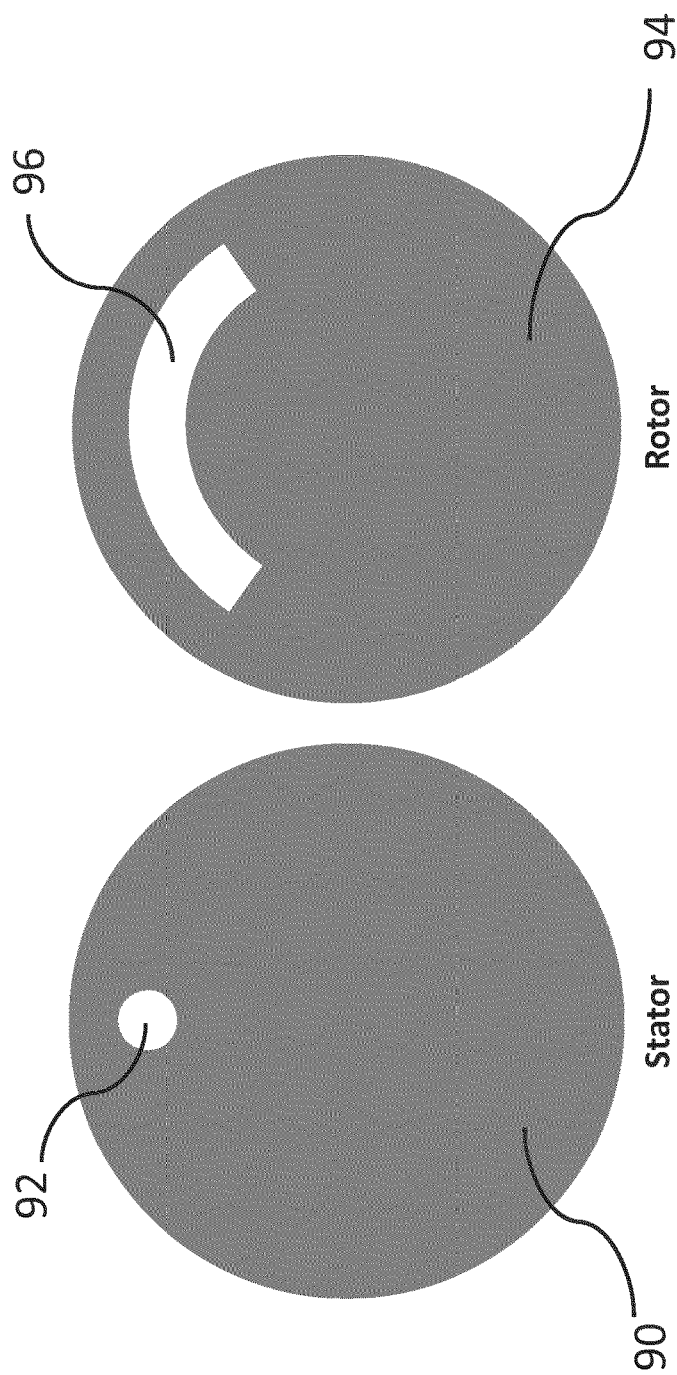
FIG. 8 illustrates a stator having a circular hole centered at a radial distance from the center of the disk, and a rotor having an inner slot of a certain angular extent centered at the same radial distance from the center of the disk as the hole of the stator in accordance with an illustrative embodiment.

In an alternative version of the first embodiment with controlled valves, the four valves could be rotary ceramic disk valves. Each rotary ceramic disk valve in this alternative embodiment employs two disks, a first disk that co-rotates with the magnet assembly and that is termed the rotor, and a second stationary disk termed the stator. The stator 90, shown in FIG. 8 (left), has a circular hole 92 centered at a certain radial distance from the center of the disk 90. The rotor 94, also shown in FIG. 8 (right), has an inner slot 96 of a certain angular extent centered at the same radial distance from the center of the disk 94 as the hole 92 of the stator. Therefore, when the two disks 90 and 94 are overlaid, the rotor 94 can be rotated so that its slot 96 will uncover the hole 92 of the stator 90.

To form a valve for use in the present embodiment, the rotor 94 and stator 90 disks are overlaid, compressed together (for example, using springs), and sealed in a cylindrical housing which has two ends. The center of the rotor 94 is attached to a shaft which extends out of one end of the valve housing through a seal (for example, a shaft seal). The rotor shaft is connected to the shaft of the rotating magnet assembly (for example, with a belt and pulley) so that the rotor shaft and rotor co-rotate with the magnet assembly. Each valve has a fluid port that collects or delivers pressurized fluid from a chamber in the valve in communication with the rotor slot 96. The faces of the two valve disks 90 and 94 in contact with one another are highly polished so that when they are compressed together, they form a face seal. In this manner, the only path for flow through the valve is from its fluid port through a rotor slot 96 and through the stator hole 92 uncovered by the rotor slot 96. If the rotor slot 96 is in a position where it does not uncover the stator hole 92, then flow through the valve is prevented. Flow can also proceed through the valve in the opposite direction: from the stator hole 92, through the rotor slot 94 (if it uncovers the stator hole), and to the fluid port of the valve.

The hole in the stator of the cold inlet valve is connected by a fluid conduit to the cold inlet port (Ci) of the bed. The hole in the stator of the cold outlet valve is connected by a fluid conduit to the cold outlet port (Co) of the bed. The hole in the stator of the hot inlet valve is connected by a fluid conduit to the hot inlet port (Hi) of the bed. The hole in the stator of the hot outlet valve is connected by a fluid conduit to the hot outlet port (Ho) of the bed.

To set the relationship between the angular position of the rotor of the cold inlet valve and the angular position of the magnet assembly, the magnet assembly is rotated so that the bed just begins to enter the gap of the assembly. With the magnet assembly in this position, the angular position of the rotor is adjusted so that the rotor slot just begins to uncover the cold inlet stator hole. The hot outlet valve has the same rotor and stator as the cold inlet valve, and the positions of the rotor and stator of the hot outlet valve are set to exactly match the positions of the rotor and stator of the cold inlet valve.

To set the relationship between the angular position of the rotor of the hot inlet valve and the angular position of the magnet assembly, the magnet assembly is rotated just past the bed, so the bed is no longer within the gap of the assembly. With the magnet assembly in this position, the angular position of the hot inlet rotor is adjusted so that the rotor slot just begins to uncover the hot inlet stator hole. The cold outlet valve has the same rotor and stator as the hot inlet valve, and the positions of the rotor and stator of the cold outlet valve are set to exactly match the positions of the rotor and stator of the hot inlet valve.

Figure 9:
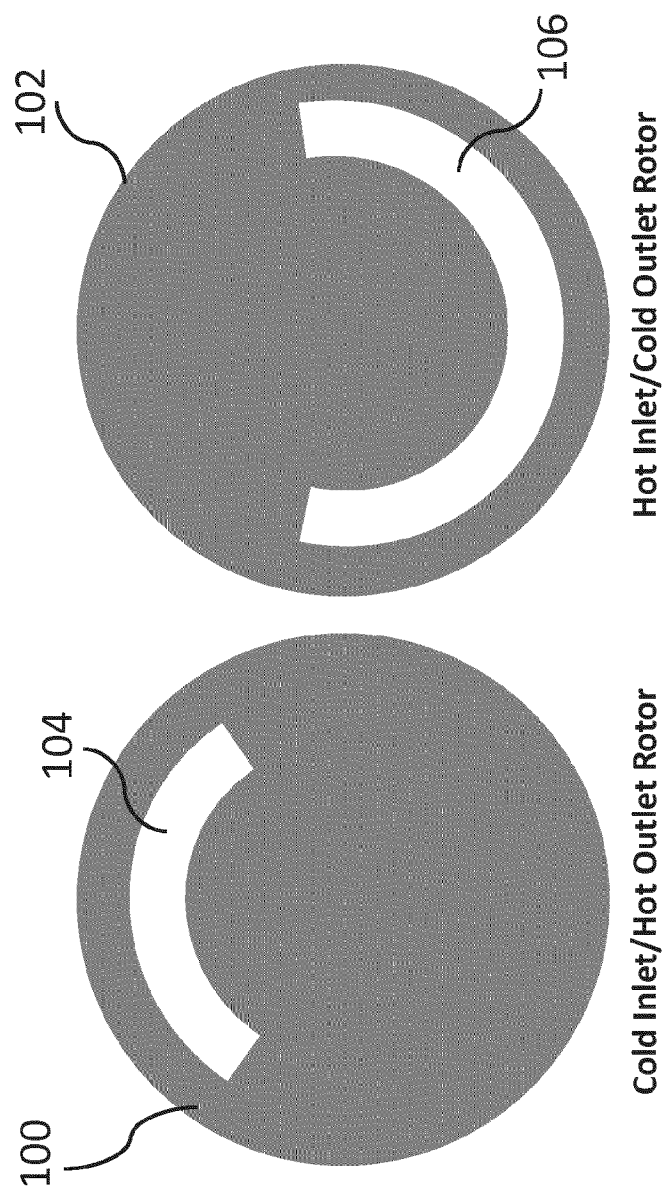
FIG. 9 illustrates rotor slots of the cold inlet and hot outlet valves with a smaller angular extent than the rotor slots of the hot inlet and cold outlet valves in accordance with an illustrative embodiment.

The slots in the rotors of the cold inlet and hot outlet valves, and the slots in the rotors of the hot inlet and cold outlet valves, are positioned so that when the angular positions of the disks are set in the manner just described, the angle subtended by the slots in the rotors of the hot inlet and cold outlet valves does not overlap the angle subtended by the slots in the rotors of the cold inlet and hot outlet valves. This desired configuration is illustrated in FIG. 9, which shows a rotor 100 from a cold inlet/hot outlet valve and a rotor 102 from a hot inlet/cold outlet valve after alignment with the magnet assembly. With this configuration, if the rotor slots 104 in the cold inlet and hot outlet valves uncover their stator holes, then the rotors in the hot inlet and cold outlet valves are blocking their corresponding stator holes. Similarly, if the rotor slots 106 in the hot inlet and cold outlet valves uncover their stator holes, then the rotors in the cold inlet and hot outlet valves are blocking their corresponding stator holes.

To implement a hot blow of duration $\Delta t_H$, the angular extent of the rotor slots in the cold inlet and hot outlet valves is chosen to be $\Delta\theta_H = \omega \Delta t_H$, where $\omega$ is the common angular velocity of the magnet assembly and the rotors (measured in degrees per second). To implement a cold blow of duration $\Delta t_C > \Delta t_H$, the angular extent of the rotor slots 106 in the hot inlet and cold outlet valves is chosen to be $\Delta\theta_C = \omega \Delta t_C$. Because the duration of the hot blow is less than the duration of the cold blow, the rotor slots 104 of the cold inlet and hot outlet valves have a smaller angular extent than the rotor slots 106 of the hot inlet and cold outlet valves, as shown in FIG. 9.

The fluid port of the cold inlet valve (which connects to the chamber in the valve in communication with the cold inlet rotor slot) is connected to the output port 48 of the cold-side linear displacer 44. Therefore, when the cold inlet rotor slot uncovers the cold inlet stator hole, a path 74 from the output of the cold-side linear displacer 40 to the cold inlet port 32 of the bed 30 is established (FIG. 7b).

The fluid port of the cold outlet valve (which connects to the chamber in the valve in communication with the cold outlet rotor slot) is connected to the entrance of the cold-side heat exchanger 64. Therefore, when the cold outlet rotor slot uncovers the cold outlet stator hole, a path 72 from the cold outlet port 34 of the bed 30 to the entrance of the cold-side heat exchanger 64 is established (FIG. 7a).

The fluid port of the hot inlet valve (which connects to the chamber in the valve in communication with the hot inlet rotor slot) is connected to the output port 50 of the hot-side linear displacer 46. Therefore, when the hot inlet rotor slot uncovers the hot inlet stator hole, a path 70 from the output of the hot-side linear displacer 46 to the hot inlet port 36 of the bed 30 is established (FIG. 7a).

The fluid port of the hot outlet valve (which connects to the chamber in the valve in communication with the hot outlet rotor slot) is connected to the entrance of the hot-side heat exchanger 66. Therefore, when the hot outlet rotor slot uncovers the hot outlet stator hole, a path 68 from the hot outlet port 38 of the bed 30 to the entrance of the hot-side heat exchanger 66 is established (FIG. 7b).

As an example of implementation of the refrigeration cycle for the bed in the present embodiment, suppose that the magnet has just rotated over the bed. Because of the rotor alignments described above, the cold inlet rotor slot just uncovers the cold inlet stator hole, providing a path for fluid from the cold-side linear displacer 40 to the cold inlet port 32 of the bed 30 (FIG. 7b). Simultaneously, the hot outlet rotor slot uncovers the hot outlet stator hole, providing a path for fluid from the hot outlet port 38 of the bed 30 to the entrance of the hot-side heat exchanger 66. The cold outlet 78 and hot inlet 80 valves prevent any flow from entering or exiting the cold outlet 34 and hot inlet 36 ports of the bed 30. To perform the hot blow, the cold-side linear displacer 40, controlled by the microprocessor, drives fluid at temperature $T_{Ci}$ through the cold inlet valve 76 to the cold inlet port 32 of the magnetized bed 30. This fluid flows through the bed 30 and exits at temperature $T_{Ho}$ through the hot outlet port 38 of the bed 30. This fluid passes through the hot outlet valve 82 and flows through the hot-side heat exchanger 66, where it exhausts heat to the ambient environment. The fluid exits the heat exchanger 66 at temperature $T_{Hi}$ and fills the fluid chamber of the hot-side linear displacer 46. Because of the choice described above for the angular extent of the cold inlet and hot outlet rotor slots, this hot blow continues for the desired duration $\Delta t_H$.

As the magnet assembly rotates completely off of the bed, the bed becomes demagnetized and drops in temperature. At this time, due to the setting of the rotor positions described above, the hot inlet rotor slot uncovers the hot inlet stator hole, providing a path for fluid from the hot-side linear displacer 42 to the hot inlet port 36 of the bed 30 (FIG. 7a). Simultaneously, the cold outlet rotor slot uncovers the cold outlet stator hole, providing a path for fluid from the cold outlet port 34 of the bed 30 to the entrance of the cold-side heat exchanger 64. The cold inlet 76 and hot outlet valves 82 prevent any flow from entering or exiting the cold inlet 32 and hot outlet 38 ports of the bed 30. To perform the cold blow, the hot-side linear displacer 42, controlled by the microprocessor, drives fluid at temperature $T_{Hi}$ (which had accumulated in the fluid chamber 46 of this displacer during the previous hot blow) through the hot inlet valve 80 to the hot inlet port 36 of the bed 30. This fluid flows through the bed 30 and emerges from the cold outlet port 34 at temperature $T_{Co}$. This fluid proceeds through the cold outlet valve 78 and flows through the cold-side heat exchanger 64, where it absorbs heat from the refrigerated environment. The fluid exits the heat exchanger 64 at temperature $T_{Ci}$ and returns to the fluid chamber 44 of the cold-side linear displacer 40, completing the refrigeration cycle. This fluid is now available for the following hot blow of the next refrigeration cycle. Because of the choice described above for the angular extent of the hot inlet and cold outlet rotor slots, this cold blow continues for the desired duration $\Delta t_C$. In this manner, the four rotary disk valves 76, 78, 80, 82 of this embodiment implement the desired flow paths and flow timing shown in FIGS. 6a and 6b that are needed to perform refrigeration.

To reduce the fluid pressure drop of the present embodiment, the wetted diameters of the fluid conduits used for the hot blow, which employs a higher flow rate than the cold blow, could be increased in size relative to the fluid conduits used for the cold blow. For example, the diameters of the cold inlet and hot outlet stator holes, and the radial widths of the corresponding rotor slots, could be increased in size relative to the corresponding apertures in the rotors and stators of the hot inlet and cold outlet valves. This reduction of the pressure drop of the present embodiment would reduce both the electrical power needed to drive the linear displacers and the undesirable fluid heating from viscous dissipation, thereby improving the performance of the system.

The Second Embodiment

In a second embodiment of the present subject matter, a magnetic refrigeration system in the RBMR configuration, uses modified rotary disk valves to provide unequal hot and cold blow durations and flow rates. In this second embodiment, a single pump, configured to produce a near-constant flow rate, drives the flow through the system, replacing the two linear displacers used in the previous embodiment.

The second embodiment employs N identical beds, where N may be any integer greater than 1. For example, N could be 2, 3, 4, 5, 8, 12, 24, or larger. These beds are arranged in a wheel so that the bed centers lie along a circular perimeter and are evenly spaced in angle. That is, the center of each bed is separated from the centers of its neighbors by an angle of 360°/N. Each of the N identical beds in the present embodiment has four fluid ports, a cold inlet port (Ci), a cold outlet port (Co), a hot inlet port (Hi) and a hot outlet port (Ho).

The second embodiment has a stationary magnet assembly with a gap that is a portion of an annulus, as illustrated in FIG. 2. Within the gap, the magnet assembly produces a high magnetic field. During operation as a magnetic refrigerator, the bed wheel rotates through the gap in the stationary magnet assembly. When a given bed enters this gap, it becomes magnetized; when the bed rotates out of the gap, it becomes demagnetized. The flow in the system is configured so that during the hot blow stage of the refrigeration cycle of a given bed, which occurs when the bed is magnetized (i.e., when it is within the gap of the magnet assembly), flow proceeds through the bed from its cold inlet port to its hot outlet port. During the cold blow stage of the refrigeration cycle, when the bed is demagnetized (i.e., when it is completely outside of the gap of the magnet assembly), flow proceeds through the bed from its hot inlet port to its cold outlet port. A schematic view of this embodiment is provided in FIG. 10. For clarity, only two beds are shown in this figure, one undergoing its hot blow while the other simultaneously undergoes its cold blow.

Figure 10:
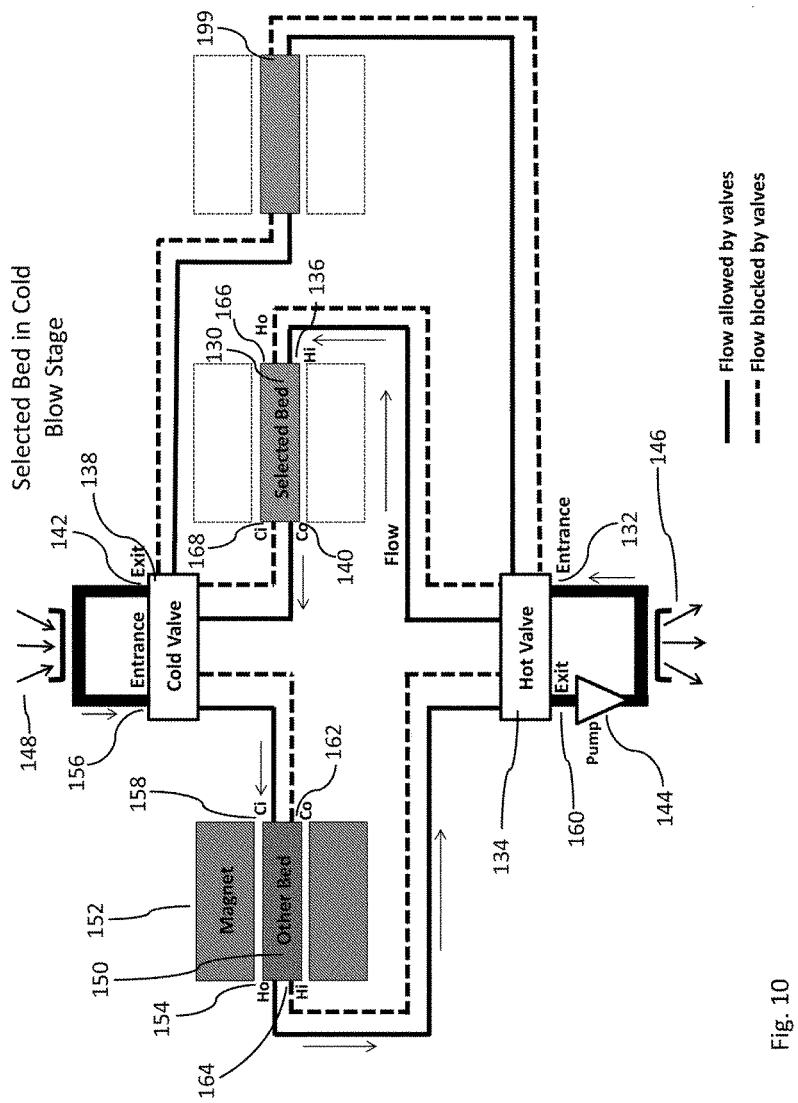
FIG. 10 illustrates a magnetic refrigeration system with modified rotary disk valves to provide unequal hot and cold blow durations and flow rates in accordance with an illustrative embodiment.
Figure 11:
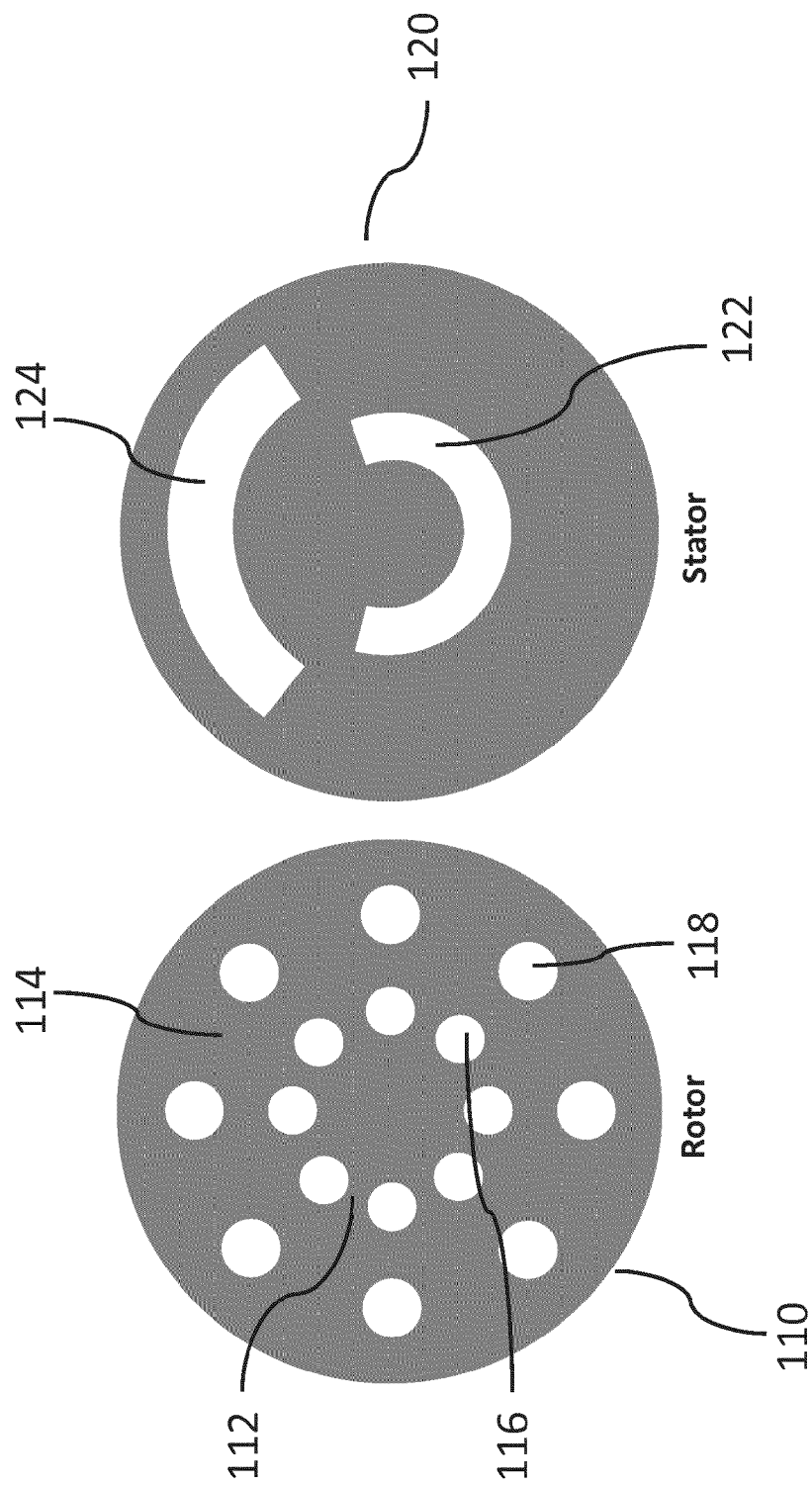
FIG. 11 illustrates a rotor disk and a stator disk used in the valves of the embodiment of FIG. 10 in accordance with an illustrative embodiment.

The second embodiment uses two valves, the hot-side valve and the cold-side valve, to deliver the desired flow configuration through the beds. These valves are shown schematically in FIG. 10. Each of these valves has two disks, a rotating disk termed the rotor and a stationary disk termed the stator. The rotors 110 used in the valves of this embodiment have two rings of holes, an inner ring 112 with N holes and an outer ring 114 with N holes, as shown in FIG. 11 (left) for N=8. Each hole 116 in the inner ring 112 is paired with a hole 118 in the outer ring 114, both holes in the pair having centers located along a ray from the center of the disk defined by a given angular position. As is illustrated in the figure, the diameters of the holes in the outer ring 114 may differ from the diameters of the holes in the inner ring 112. In addition, although the holes shown in the figure are circular, this is not necessary for the operation of the valve and in some instances it may be advantageous to use non-circular holes (for example, holes with an elliptical shape, etc.). The centers of the holes in the inner 112 and outer rings 114 are evenly spaced in angle along the ring so that their centers are separated from the centers of their neighbors by an angle of 360°/N, the same as the beds. Thus, the arrangement of the holes in the stators mirrors the arrangement of the beds.

The stator disks 120 have two slots, an inner slot 122 and an outer slot 124, as shown in FIG. 11 (right). The inner slot 122 of the stator has a certain angular extent and is located at the same radial distance from the disk center as the inner ring of holes 112 on the rotor 110. The outer slot 124 of the stator 120 has an angular extent that will in general be different from the angular extent of the inner slot 122. The outer slot 124 is located at the same radial distance from the disk center as the outer ring of holes 114 on the rotor 110. Thus, when the rotor 110 overlays the stator 120, the inner slot of the stator 122 will uncover some of the holes in the inner ring of holes 112 on the rotor 110 while the outer slot of the stator 124 will uncover some of the holes in the outer ring of holes 114 on the rotor 110. Additionally, the slots 122, 124 on the stator 120 are arranged so that there is no overlap in the angular regions they subtend. Therefore, for any given pair of rotor holes (one (116) on the inner ring 112 and one (118) on the outer ring 114), at any angular position of the rotor 110, only one of these two rotor holes could be uncovered by a stator slot: if one hole 116 in the pair is uncovered by a stator slot, the other hole 118 will be covered.

To form a valve for use in the present embodiment, the rotor 110 and stator 120 disks are overlaid, compressed together (for example, using springs), and sealed in a cylindrical housing which has two ends. The center of the rotor 110 is attached to a shaft which extends out of one end of the valve housing through a seal (for example, a shaft seal). The rotor shaft is connected to the rotating bed wheel so that the rotor shaft and rotor co-rotate with the bed wheel. The valve has one fluid port that collects or delivers pressurized fluid from a chamber in communication with the outer stator slot 124. The valve has a second fluid port that collects or delivers fluid from a second, separate chamber that is in communication with the inner stator slot 122. There is no communication between these two chambers. The faces of the two valve disks in contact with one another are highly polished so that when they are compressed together, they form a face seal. In this manner, the only path for flow through the valve is from one of its fluid ports through a stator slot and through any rotor hole uncovered by a stator slot. Flow can also proceed through the valve in the opposite direction: through a rotor hole, through a stator slot that uncovers this rotor hole, and to one of the fluid ports of the valve that is in communication with this stator slot.

Figure 12:
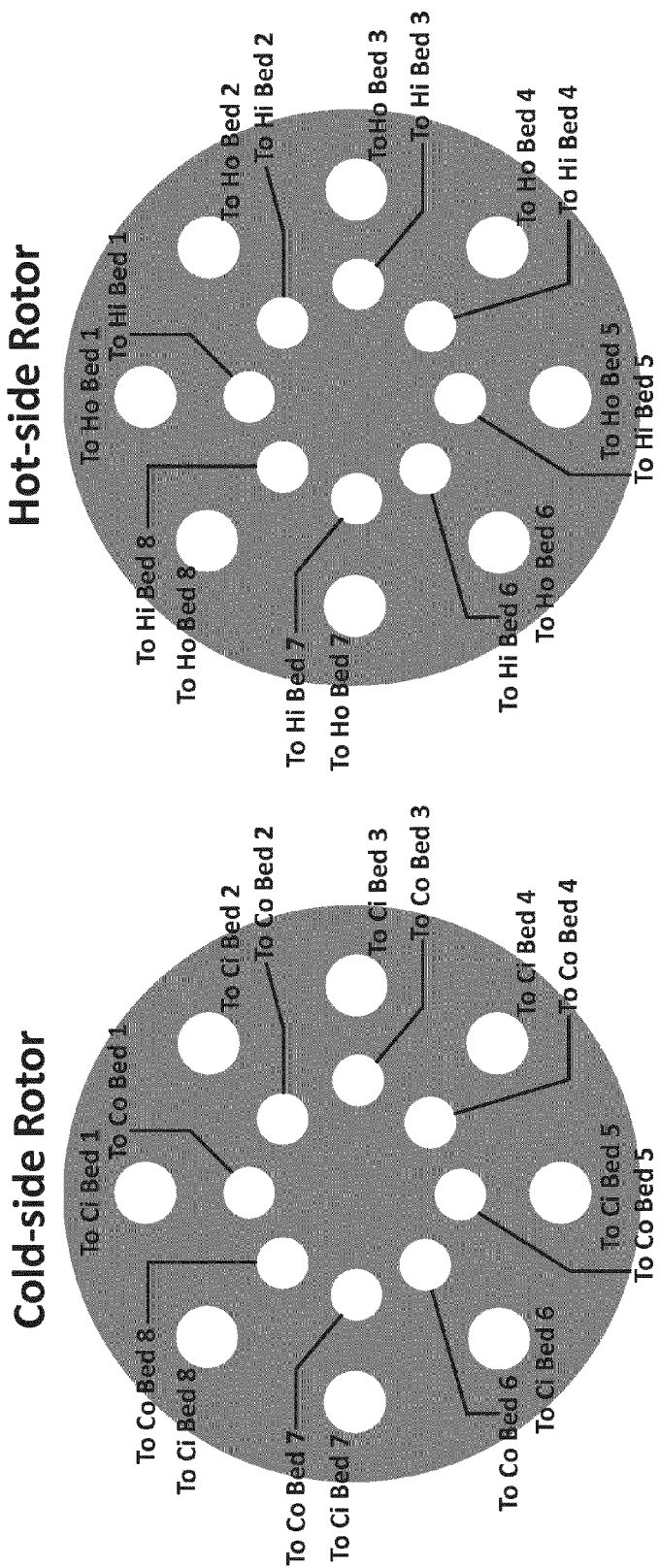
FIG. 12 illustrates a cold-side rotor and a hot-side rotor having pairs of holes equal to the number of beds in accordance with an illustrative embodiment.

Each of the N pairs of holes in the inner and outer rings of the rotor of the cold-side valve is associated with one of the N beds. Similarly, each of the N pairs of holes in the inner and outer rings of the rotor of the hot-side valve is associated with one of the N beds. Each hole in the outer ring of the cold-side rotor is connected by a fluid conduit to the cold inlet port of its associated bed, while the paired hole in the inner ring of this rotor is connected by a fluid conduit to the cold outlet port of the associated bed. This configuration is illustrated in FIG. 12a for N=8. In alternative embodiments, N may be larger or smaller. For example, the "Bed 1" of FIG. 12 may correspond to the bed 150 of FIG. 10, the "Bed 2" of FIG. 12 may correspond to the bed 130 of FIG. 10, the "Bed 3" of FIG. 12 may correspond to the bed 199 of FIG. 10, etc.

Each hole in the outer ring of the hot-side rotor is connected by a fluid conduit to the hot outlet port of its associated bed, while the paired hole in the inner ring of this rotor is connected by a fluid conduit to the hot inlet port of the associated bed. This configuration is shown in FIG. 12b. For both of the valves, the fluid conduits connecting the rotor holes to the bed ports will co-rotate with the rotor and the bed wheel.

On the cold-side valve, the fluid port connected to the chamber in communication with the outer stator slot will be termed the entrance port for the valve. During operation of the magnetic refrigeration system, fluid at the cold inlet temperature $T_{Ci}$ will enter the cold-side valve through this entrance port. The fluid port connected to the chamber in communication with the inner stator slot will be termed the exit port for the valve. During operation of the magnetic refrigeration system, fluid at the cold outlet temperature $T_{Co}$ will exit the valve through this port. These entrance 156 and exit 142 ports are shown in FIG. 10. As illustrated in this figure, the cold-side heat exchanger 148 is plumbed between the exit 142 and entrance 156 ports of the cold-side valve 138.

On the hot-side valve, the fluid port connected to the chamber in communication with the outer stator slot will be termed the exit port for the valve. During operation of the magnetic refrigeration system, fluid at the hot outlet temperature $T_{Ho}$ will exit the hot-side valve through this port. The fluid port connected to the chamber in communication with the inner stator slot will be termed the entrance port for the valve. During operation of the magnetic refrigeration system, fluid at the hot inlet temperature $T_{Hi}$ will enter the valve through this port. These entrance 132 and exit 160 ports are shown in FIG. 10. As illustrated in the figure, the hot-side heat exchanger 146 is plumbed between the exit 160 and entrance 132 ports of the hot-side valve 134.

To set the angular position of the rotor of the cold-side valve relative to the angular position of the bed wheel, one bed in the wheel is selected, with a cold inlet port that is connected by a fluid conduit to a particular hole in the outer ring of the stator of the cold-side valve. The bed wheel is rotated to a position where the selected bed just begins to enter the gap of the magnet assembly. With the bed wheel held in this position, the cold-side rotor is rotated so that the outer rotor hole connected to the cold inlet port of the selected bed just begins to be uncovered by the outer stator slot. Next, the bed wheel is rotated so that the selected bed has just emerged from the gap in the magnet assembly. The inner slot of the stator should be configured so that with the bed wheel in this position, the hole in the inner ring of the rotor connected to the cold outlet port of the selected bed just begins to be uncovered by the inner stator slot. In an illustrative embodiment, the rotor and stator of the hot-side valve are identical to the rotor and stator of the cold-side valve and are set to have the exactly the same positions as the rotor and stator of the cold-side valve.

Because the angular arrangement of the holes in the rotors mirrors the angular arrangement of the beds in the bed wheel, and because the rotor co-rotates with the beds in the bed wheel, it is evident that setting the alignment based on one selected bed will also establish the correct alignment for all the beds. It is also evident that with this alignment, each bed in the system will undergo the same refrigeration cycle, but with a time delay between adjacent beds given by 360°/(N×ω), where ω is the common angular velocity of the bed wheel and the rotors (measured in degrees per second).

To implement a hot blow of duration $\Delta t_H$, the angular extent of the outer stator slots is chosen to be $\Delta\theta_H = \omega \Delta t_H$. To implement a cold blow of duration $\Delta t_C$, the angular extent of the inner stator slots is chosen to be $\Delta\theta_C = \omega \Delta t_C$. Because the hot blow duration is shorter than the cold blow duration, the angular extent of the outer stator slots 124 is less than the angular extent of the inner stator slots 122, as shown in FIG. 11.

Because the pump 144 runs continuously in the present embodiment, at any instant of time there must be a complete fluid circuit through the system. To accomplish this, the number of beds in the system (and therefore the number of holes in the inner or outer ring of the rotors) and the angular extents of the stator slots must be chosen so that at least one bed is undergoing its hot blow stage and at least one bed is undergoing its cold blow stage at any given instant of time. This operation is illustrated in FIG. 10, where the complete fluid circuit through the system is indicated by the solid black lines. This requirement is generally satisfied for any desirable choices of N, $\Delta t_C$, and $\Delta t_H$, so this requirement does not usually limit the selection of these parameters.

Implementation of the refrigeration cycle for a selected bed in the present embodiment is described below. When this selected bed 130 has rotated completely away from the gap in the magnet assembly, as shown schematically for the bed 130 on the right-hand side of FIG. 10, the inner stator slot of the hot-side valve 134 begins to uncover the rotor hole in the inner ring connected to the hot inlet port of this bed. Thus, an open fluid path from the entrance port 132 of the hot-side valve 134 (which connects to the chamber in the valve in communication with the inner slot) to the hot inlet port 136 of the selected bed 130 is established while the bed 130 is demagnetized. Because the cold-side valve 138 has the same disk alignment as the hot-side valve 134, the inner slot of the stator of the cold-side valve 138 simultaneously uncovers the rotor hole in the inner ring connected to the cold outlet port 140 of the selected bed 130. Thus, an open fluid path from the cold outlet port 140 of the bed to the exit port 142 of the cold-side valve 138 is established while the selected bed 130 is demagnetized. Pressurized fluid provided by the pump 144, which in FIG. 10 is shown plumbed in series with the hot-side heat exchanger 146, leaves the hot-side heat exchanger 146 and enters the entrance port 132 of the hot-side valve 134. This fluid, at temperature $T_{Hi}$, passes through the inner stator slot, through the uncovered hole in the inner ring of the rotor, and is delivered to the hot inlet port 136 of the selected bed 130. This fluid passes through the bed 130, becoming colder as it gives up heat to the cold, demagnetized magnetocaloric material in the bed. This fluid emerges from the cold outlet port 140 of the selected bed 130 at temperature $T_{Co}$, flows through the uncovered hole in the inner ring of the cold-side rotor, through the inner stator slot, and to the exit port 142 of the cold-side valve 138. From there, the fluid flows through the cold-side heat exchanger 148, where it pulls heat from the refrigerated environment, allowing this environment to maintain its colder temperature. The fluid emerges from the cold-side heat exchanger 148 at temperature $T_{Ci}$.

During this cold blow, because the hole 116 in the inner rotor ring 112 of the rotor 110 of the hot-side valve 134 is uncovered by the inner stator slot 122, its paired hole 118 in the outer ring 114 of the hot-side rotor 110 is blocked by the stator 120 (FIG. 11). This hole 118 is connected to the hot outlet port 166 of the selected bed 130 (FIG. 10). Therefore, as the hot-side valve 134 delivers flow to the hot inlet port 136 of the selected bed 130, it simultaneously prevents flow from entering or exiting the hot outlet port 166 of the bed 130. Similarly, because the hole 116 in the inner rotor ring 112 of the cold-side valve 138 is uncovered by the inner stator slot 122, its paired hole 118 in the outer ring 114 of the cold-side rotor 110 is blocked by the stator 120. This hole 118 is connected to the cold inlet 168 port of the selected bed 130. Therefore, as the cold-side valve 138 collects flow from the cold outlet port 140 of the selected bed 130, it simultaneously prevents flow from entering or exiting the cold inlet port 168 of the bed 130. The fluid paths blocked by the valves are shown as the dashed black lines in FIG. 10. The valves in this second embodiment therefore establish the desired flow from the hot inlet port 136 to the cold outlet port 140 of the selected bed 130 while it is demagnetized, and prevent any other type of flow through the bed 130. Because of the choice described above for the angular extent of the inner stator slots 122 of the two valves 134 and 138, this desired flow pattern continues for the desired duration $\Delta t_C$ of the cold blow stage.

Continuing the example, one of the beds that is undergoing its hot blow stage as the selected bed 130 is undergoing its cold blow stage is described below. This other bed 150 is magnetized, as illustrated in FIG. 10, and because of the alignment of the cold-side valve disks and their positioning relative to the position of the bed wheel and magnet assembly 152, the outer stator slot of the cold-side valve 138 must have uncovered the hole in the outer rotor ring connected to the cold inlet port of this bed 150. Because the hot-side valve disks have the same alignment as the cold-side valve disks, the hole in the outer ring of the hot-side rotor connected to the hot outlet port 154 of the bed 150 is also uncovered by the outer slot of the hot-side stator. The pressurized fluid that exits the cold-side heat exchanger 148 at temperature $T_{Ci}$ enters the entrance port 156 of the cold-side valve 138, which is connected to the chamber of the valve in communication with the outer stator slot. This fluid passes through the outer stator slot of the cold-side valve 138, through the uncovered hole in the outer ring of the rotor, and is delivered to the cold inlet port 158 of the bed 150. Flow from the cold inlet port 158 of the bed can then proceed through the bed 150, rising in temperature as it picks up heat from the hot, magnetized magnetocaloric material in the bed 150. This hot fluid at temperature $T_{Ho}$ exits the bed 150 at the hot outlet port 154, passes through the corresponding hole in the outer ring of the hot-side rotor, through the outer slot of the hot-side stator, and out of the exit port 160 of the hot-side valve 134. This fluid then returns to the pump 144, as illustrated in FIG. 10, and continues through the hot-side heat exchanger 146, giving up heat to the ambient environment, and returning to temperature $T_{Hi}$. This completes the fluid circuit and this fluid is now available for performing the cold blow for any of the demagnetized beds, including the selected bed 130.

Figure 13:
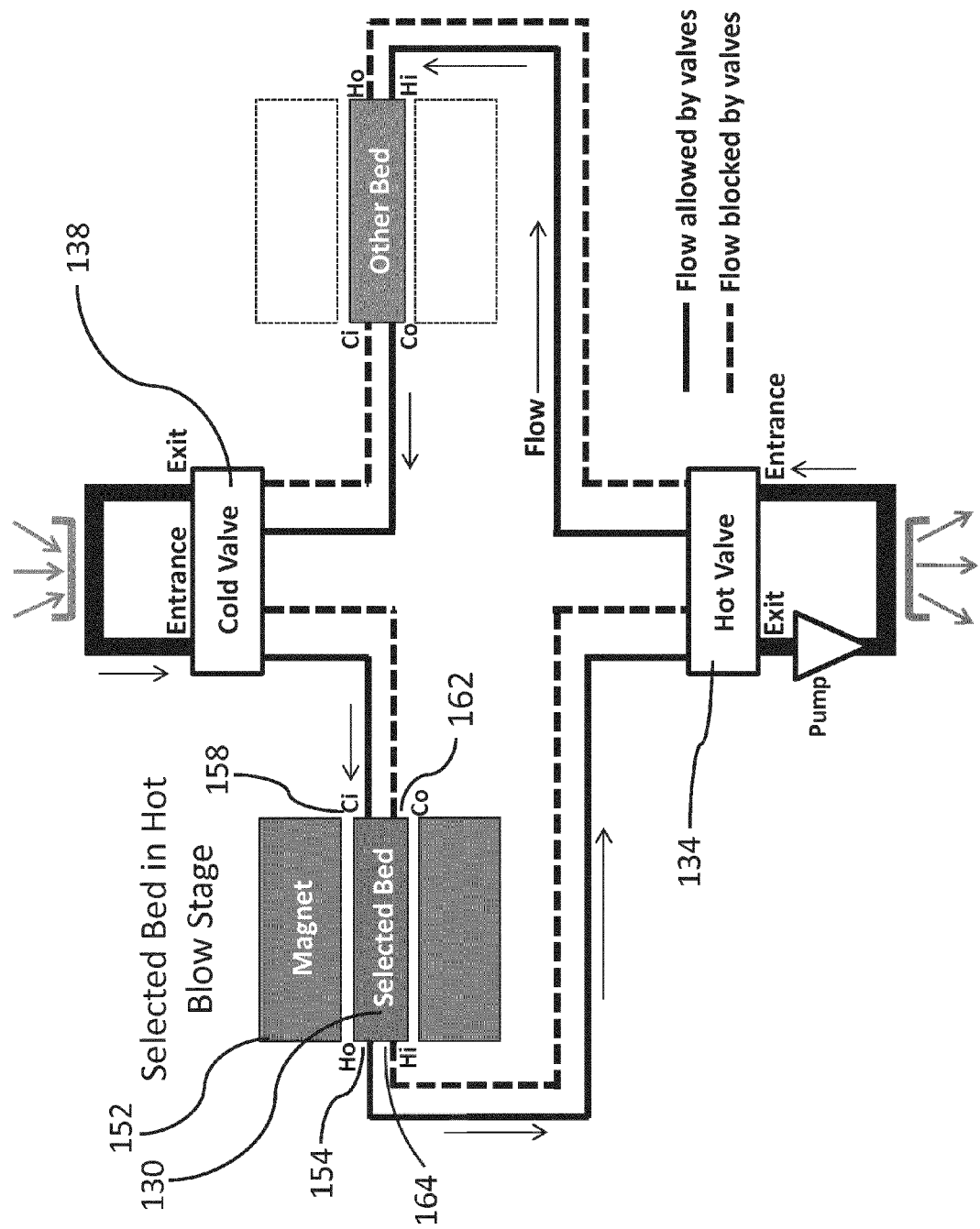
FIG. 13 illustrates a hot blow fluid path through a selected bed in a magnetic refrigeration system in accordance with an illustrative embodiment.

As time progresses, the cold blow of the selected bed 130 will end as the inner rotor holes connected to the hot inlet and cold outlet ports of the bed rotate past the inner slots of the stators. As the bed 130 rotates into the gap of the magnet assembly 152, the outer rotor holes of the cold-side 138 and hot-side 134 valves, which are connected to the cold inlet and hot outlet ports of the selected bed, become uncovered by the outer stator slots, allowing the hot blow to proceed through the bed. This hot blow is illustrated schematically in FIG. 13. The solid black lines in this figure illustrate the fluid path through the system.

The hot blow proceeds through the outer holes of the rotors in the hot-side 134 and cold-side 138 valves, which are uncovered by the outer stator slots. Because the outer rotor holes are uncovered, the corresponding inner holes are therefore blocked by the stators. Thus, the cold-side valve 138 blocks any flow to or from the cold outlet port 162 of a bed undergoing its hot blow while simultaneously, the hot-side valve blocks any flow to or from the hot inlet port 164 of this bed. Flow can only proceed through the selected bed 130 from the cold inlet port 158 to the hot outlet port 154, as desired for the hot blow. The fluid paths blocked by the valves are shown as the dashed black lines in FIG. 13. The hot blow for the selected bed 130 persists as long as the outer stator slots uncover the outer rotor holes connected to the cold inlet and hot outlet ports of the bed. Because of the choice described above for the angular extent of the outer rotor slots, this hot blow will last for the desired duration $\Delta t_H$.

With N beds in the system, the outer slot in a stator will generally expose several holes in the outer ring of the rotor, so that the hot blow is performed on several beds simultaneously. Similarly, the inner slot of the stator will generally expose several holes in the inner ring of the rotor, so that the cold blow is performed on several beds simultaneously. In the presently described subject matter, the duration of the hot blow is less than the duration of the cold blow, so the angular extent of the outer stator slots 124 will be less than the angular extent of the inner stator slots 122, as illustrated in FIG. 11. Because of this difference in angular extents, the number of outer rotor holes in the outer ring 114 uncovered by the outer stator slots 124 will be less than the number of inner rotor holes in the inner ring 112 uncovered by the inner stator slots 122. Therefore, the number of beds undergoing the hot blow stage at any given instant of time will generally be less than the number of beds undergoing the cold blow stage. Let $n_H$ represent the number of beds undergoing the hot blow stage and let $n_C > n_H$ represent the number of beds undergoing the cold blow stage. Because the pump establishes a near-constant flow rate Φ through the system, and because this flow gets evenly divided among the beds open to flow, the flow rate through a bed during the hot blow will be inversely proportional to $n_H$, while the flow rate through a bed during the cold blow will be inversely proportional to $n_C$. For unequal blows, $n_C > n_H$ and therefore $\Phi_C < \Phi_H$, as desired.

It is evident that $n_H$ will be proportional to the angular extent $\Delta\theta_H$ of the outer stator slots 124, while $n_C$ will be proportional to the angular extent $\Delta\theta_C$ of the inner stator slots 122. Therefore, the hot blow flow rate will be inversely proportional to $\Delta\theta_H$ and the cold blow flow rate will be inversely proportional to $\Delta\theta_C$. The ratio of the hot blow flow rate to the cold blow flow rate will therefore be equal to the ratio of $\Delta\theta_C$ to $\Delta\theta_H$. This latter ratio, by the choice above for the angular extents of the stator slots, is equal to the ratio of $\Delta t_C$ to $\Delta t_H$. It has therefore been determined that:

$$\frac{\Phi_H}{\Phi_C} = \frac{\Delta t_C}{\Delta t_H}. \qquad \text{Equation 10}$$

This relationship can be used to satisfy the flow rate condition of Equation 4. Therefore, the use of unequal angular extents for the stator slots of the disk valves will implement unequal hot and cold blow durations and flow rates and will satisfy the flow rate condition of Equation 4, as desired. By adjusting the near constant flow rate Φ established by the pump, any desired value for the hot blow flow rate $\Phi_H$ or the cold blow flow rate $\Phi_C$ can be established. Once one of these blow flow rates is established through the choice of Φ, the other blow flow rate is determined by Equation 10.

To reduce the fluid pressure drop of the present embodiment, the wetted diameters of the fluid conduits conveying fluid between the valves and the beds for the hot blow, which employs a higher bed flow rate than the cold blow, could be increased in size relative to the fluid conduits conveying fluid between the valves and the beds for the cold blow. For example, the radial width of the outer stator slots 124 and the size of the outer rotor holes 118 in the hot and cold valves could be increased in size relative to the radial width of the inner stator slots 122 and the size of the inner rotor holes 116, as illustrated in FIG. 11. The resulting reduction of the pressure drop of the present embodiment would reduce both the electrical power needed to drive the pump and the undesirable fluid heating from viscous dissipation, and thereby improve the performance of the system.

In the present embodiment, the hot blow is channeled through the outer stator slots 124 and outer rotor holes 118 of the valves, while the cold blow is channeled through the inner stator slots 122 and inner rotor holes 116. This assignment could be switched without altering the basic performance of the valves. However, the choice used in the present embodiment is preferable because the outer rotor holes 118, which are located at a greater radial distance from the center of the rotor disk 110 than the inner holes 116, are moving with a faster speed than the inner holes. This faster hole speed can enable a faster ramp-up of the flow to the bed when the outer rotor hole is first uncovered by the outer stator slot, and a faster ramp-down of the flow when the end of the outer rotor hole passes beyond the other end of this stator slot. This can enable more precise control of the bed flow during the shorter hot blow duration.

The Third Embodiment

In a third embodiment, a magnetic refrigeration system in the RMMR configuration uses modified rotary disk valves to provide unequal hot and cold blow durations and flow rates. In this third embodiment, a single pump, configured to produce a near-constant flow rate, drives flow through the system.

The third embodiment employs N identical, fixed beds, where N may be any integer greater than 1. For example, N could be 2, 3, 4, 5, 8, 12, 25, or larger. These fixed beds are arranged so that the bed centers lie along a circular perimeter and are evenly spaced in angle; that is, the center of each bed is separated from the centers of its neighbors by an angle of 360°/N. Each of the N identical beds in the present embodiment has four fluid ports, a cold inlet port (Ci), a cold outlet port (Co), a hot inlet port (Hi) and a hot outlet port (Ho).

This embodiment employs a rotating magnet assembly with a gap that is a portion of an annulus, as illustrated in FIG. 2. Within this gap, the magnet assembly produces a high magnetic field. The fixed beds and the magnet gap are arranged so that any given bed will fit inside the gap as the magnet assembly rotates over it. During operation as a magnetic refrigerator, the magnet assembly rotates over the circular arrangement of the beds. When the magnet assembly rotates over a given bed and the given bed therefore enters the gap in the magnet assembly, it becomes magnetized; when the magnet assembly rotates away from the given bed, it becomes demagnetized. The flow in the system is configured so that during the hot blow stage of the refrigeration cycle of a given bed, which occurs when the bed is magnetized (i.e., when it is within the gap of the magnet assembly), flow proceeds through the bed from its cold inlet port to its hot outlet port. During the cold blow stage of the refrigeration cycle, when the bed is demagnetized (i.e., when it is completely outside of the gap of the magnet assembly), flow proceeds through the bed from its hot inlet port to its cold outlet port. A schematic view of this embodiment is provided in FIG. 14. For clarity, only two beds are shown in this figure, one undergoing its hot blow (left) while the other simultaneously undergoes its cold blow (right).

Figure 14:
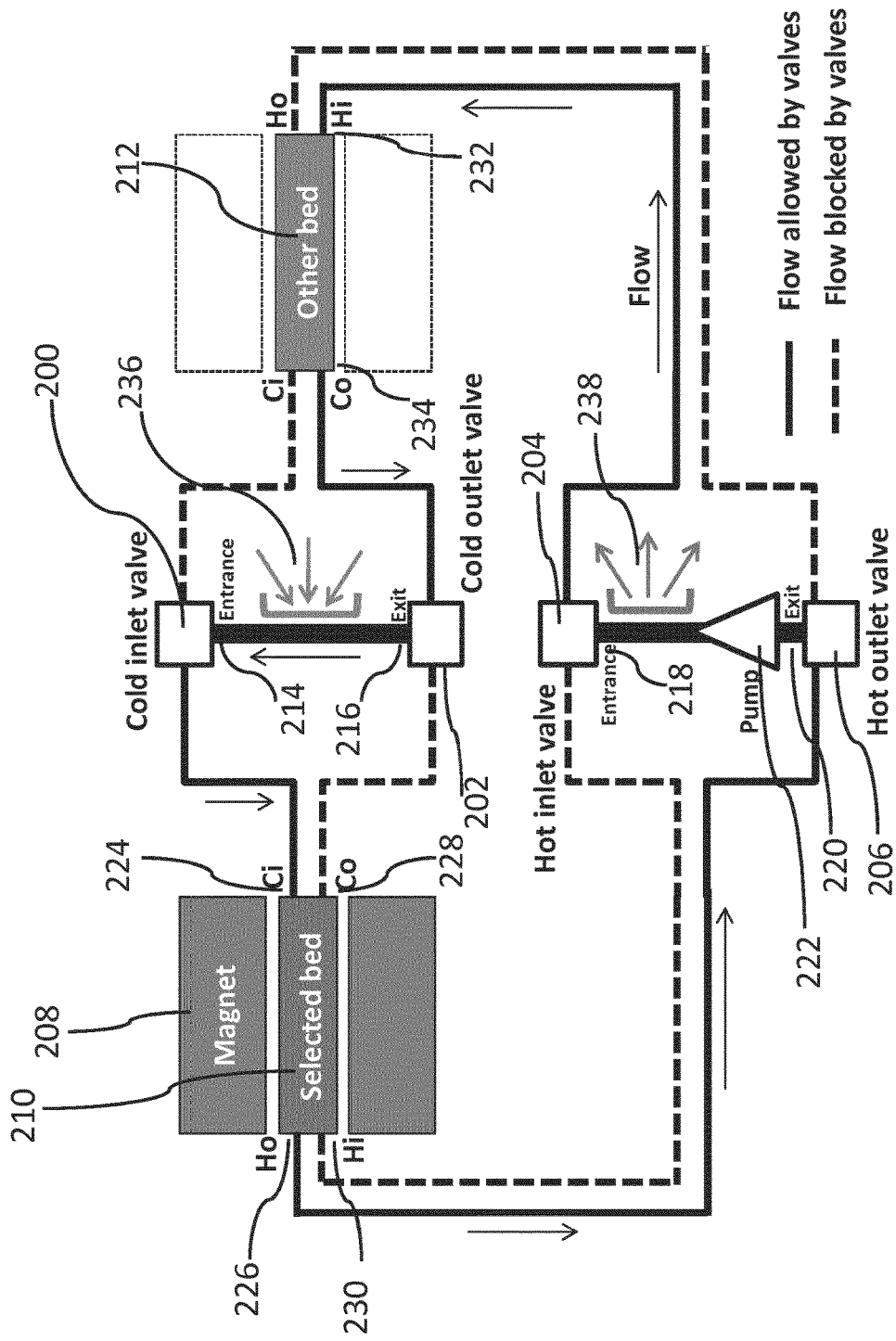
FIG. 14 illustrates a magnetic refrigeration system having a first selected bed undergoing a hot blow and a second bed simultaneously undergoing a cold blow in accordance with an illustrative embodiment.
Figure 15:
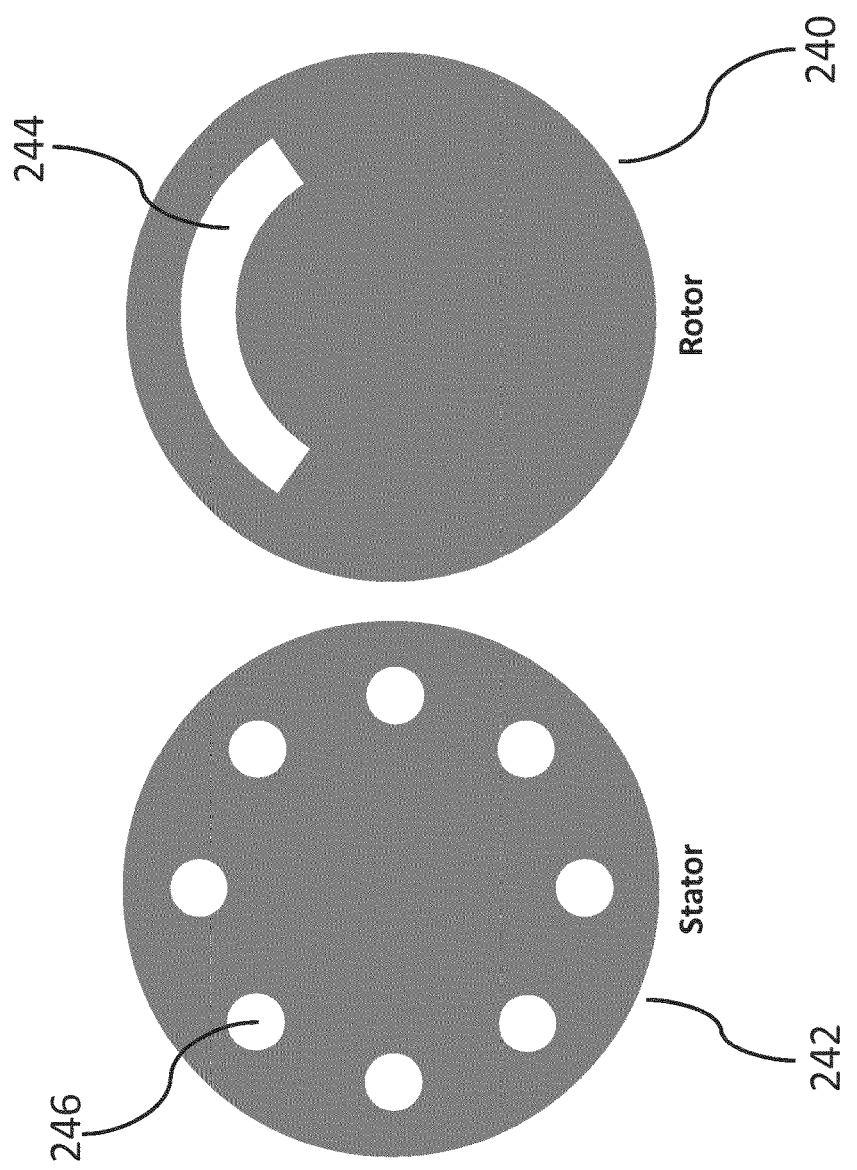
FIG. 15 illustrates a rotor having a slot with a certain angular extent, and a stator having a ring of 8 holes in accordance with an illustrative embodiment.

The third embodiment uses four valves, the hot inlet valve 204, hot outlet valve 206, cold inlet valve 200, and cold outlet valve 202, to deliver the desired flow configuration through the beds. These valves are shown schematically in FIG. 14. Each of these valves has two disks, a rotor 240 and stator 242 (FIG. 15). The rotor 240, which co-rotates with the magnet assembly, has a slot 244 with a certain angular extent, as shown in FIG. 15 (right). The stator 242 has a ring of N holes 246, as shown in FIG. 15 (left) for N=8. The centers of the stator holes 246 are separated from the centers of their neighbors by an angle of 360°/N. Thus, the arrangement of the stator holes mirrors the arrangement of the beds. The radial distance from the center of the stator 242 to its ring of holes 246 is equal to the radial distance from the center of the rotor 240 to its angular slot 244, so that when the rotor 240 and stator 242 are overlaid, the slot 244 in the rotor 240 uncovers some of the holes 246 in the stator 242. The cold inlet 200 and hot outlet 206 valves have identical rotors and stators. The hot inlet 204 and cold outlet 202 valves also have identical rotors and stators, but these rotors and stators will in general differ from the rotors and stators of the cold inlet and hot outlet valves. To implement a hot blow of duration $\Delta t_H$, the angular extent of the rotor slots in the cold inlet 200 and hot outlet 206 valves is chosen to be $\Delta\theta_H=\omega\Delta t_H$, where $\omega$ is the common angular velocity of the magnet assembly 208 and the rotors (measured in degrees per second). To implement a cold blow of duration $\Delta t_C > \Delta t_H$, the angular extent of the rotor slots in the hot inlet 204 and cold outlet 202 valves is chosen to be $\Delta\theta_C=\omega\Delta t_C$. Because the duration of the hot blow is shorter than the duration of the cold blow, the rotor slots of the cold inlet 200 and hot outlet 206 valves have a smaller angular extent than the rotor slots of the hot inlet 204 and cold outlet 202 valves.

To form a valve for use in the present embodiment, the rotor and stator disks are overlaid, compressed together (for example, using springs), and sealed in a cylindrical housing which has two ends. The center of the rotor is attached to a shaft which extends out of one end of the valve housing through a seal (for example, a shaft seal). The rotor shaft is connected to the shaft of the rotating magnet assembly (for example, with a belt and pulley) so that the rotor shaft and rotor co-rotate with the magnet assembly. Each valve has a fluid port that collects or delivers pressurized fluid from a chamber in the valve in communication with the rotor slot. The faces of the two valve disks in contact with one another are highly polished so that when they are compressed together, they form a face seal. In this manner, the only path for flow through the valve is from its fluid port through a rotor slot and through any stator hole uncovered by the rotor slot. Flow can also proceed through the valve in the opposite direction: from a stator hole, through a rotor slot that uncovers this stator hole, and to the fluid port of the valve that is in communication with the rotor slot.

Figure 16:
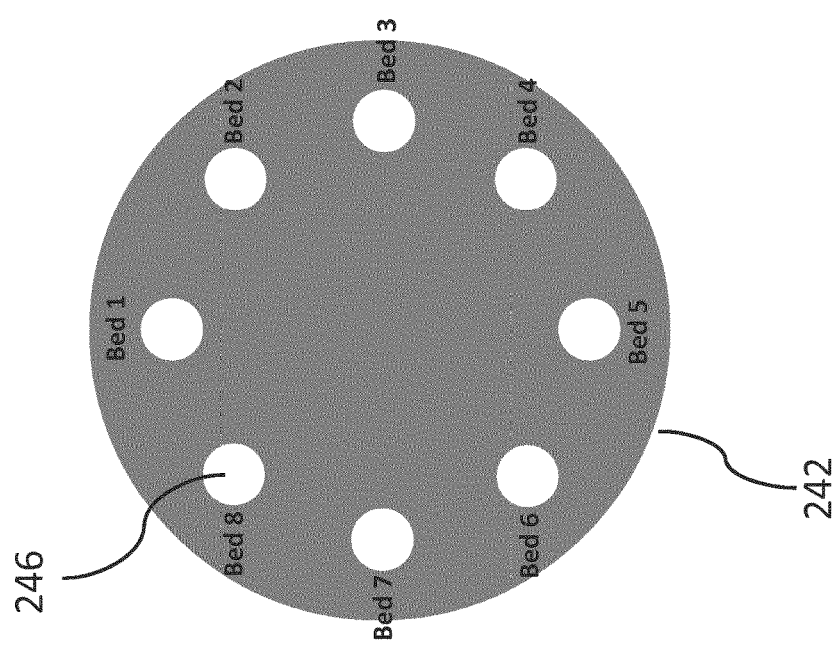
FIG. 16 illustrates the association of holes in the stators with valves of the beds, for N=8, in accordance with an illustrative embodiment.

Each of the N holes in the stators of the valves is associated with one of the N beds. This association is illustrated in FIG. 16 for one stator 242 with N=8. Each hole 246 in the stator 242 of the cold inlet valve 200 is connected by a fluid conduit to the cold inlet port (Ci) of its associated bed. Each hole 246 in the stator 242 of the cold outlet valve 202 is connected by a fluid conduit to the cold outlet port (Co) of its associated bed. Each hole 246 in the stator 242 of the hot inlet valve 204 is connected by a fluid conduit to the hot inlet port (Hi) of its associated bed. Each hole 246 in the stator 242 of the hot outlet valve 206 is connected by a fluid conduit to the hot outlet port (Ho) of its associated bed.

To set the relationship between the angular position of the rotor and stator of the cold inlet valve 200 and the angular position of the magnet assembly 208, one bed 210 is selected and the magnet assembly 208 is rotated so that the selected bed 210 just begins to enter the gap of the assembly 208. With the magnet assembly 208 in this position, the angular position of the rotor 240 is adjusted so that the rotor slot 244 just begins to uncover the stator hole 246 connected to the cold inlet port 224 of the selected bed 210 (FIGS. 14 and 15). The positions of the identical rotor 240 and stator 242 of the hot outlet valve 206 are set to exactly match the positions of the rotor 240 and stator 242 of the cold inlet valve 200.

Figure 17:
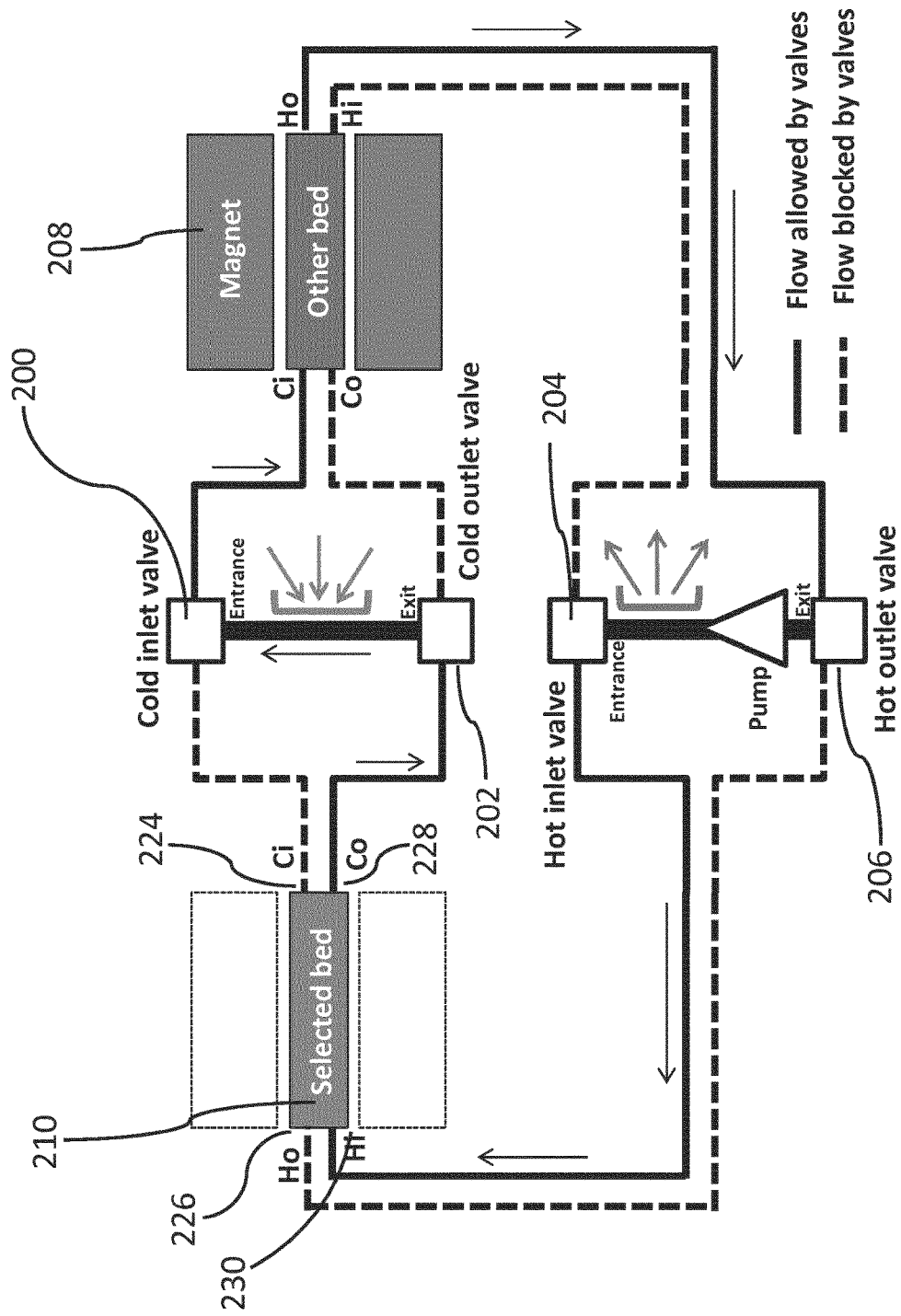
FIG. 17 illustrates a magnetic refrigeration system having a first selected bed undergoing a cold blow and a second bed simultaneously undergoing a hot blow in accordance with an illustrative embodiment.

To set the relationship between the angular position of the rotor and stator of the hot inlet valve 204 and the angular position of the magnet assembly 208, one bed 210 is selected and the magnet assembly 208 is rotated so that the selected bed 210 has just emerged from the gap of the assembly 208 (FIG. 17). With the magnet assembly 208 in this position, the angular position of the rotor 240 is adjusted so that the rotor slot 244 just begins to uncover the stator hole 246 connected to the hot inlet port 230 of the selected bed 210 (FIGS. 15 and 18). The positions of the identical rotor and stator of the cold outlet valve 202 are set to exactly match the positions of the rotor and stator of the hot inlet valve.

Because the rotors 240 co-rotate with the magnet assembly 208, and because the positions of the beds in this embodiment mirror the positions of the stator holes 246, it is evident that setting the rotor 240 position based on one selected bed 210 will also establish the correct alignment for all the beds. It is also evident that each bed in the system will undergo the same refrigeration cycle, but with a time delay between adjacent beds given by $360°/(N\times\omega)$.

The slots in the rotors of the cold inlet and hot outlet valves, and the slots in the rotors of the hot inlet and cold outlet valves, are positioned so that when the angular alignments of the disks are set in the manner just described, the angle subtended by the slots in the rotors of the hot inlet and cold outlet valves does not overlap the angle subtended by the slots in the rotors of the cold inlet and hot outlet valves. This desired configuration is illustrated in FIG. 9, which shows a rotor 100 from the cold inlet/hot outlet valve and a rotor 102 from a hot inlet/cold outlet valve after alignment with the magnet assembly. With this configuration, if the rotor slots 104 in the cold inlet and hot outlet valves uncover a stator hole 246 (FIG. 15), then the rotors 102 in the hot inlet and cold outlet valves are blocking the corresponding holes 246 in the stators of the latter valves. Conversely, if the rotor slots 106 in the hot inlet and cold outlet valves uncover a stator hole 246, then the rotors 100 in the cold inlet and hot outlet valves are blocking the corresponding holes 246 in the stators.

In the present embodiment, the pump 222 runs continuously and therefore, at any instant of time, there must be a complete fluid circuit through the system. To accomplish this, the number of beds in the system (and therefore the number of holes in the stators of the valves) and the angular extents of the rotor slots must be chosen so that at least one bed is undergoing its hot blow stage and at least one bed is undergoing its cold blow stage at any given instant of time. This operation is illustrated in FIG. 14, where the complete fluid circuit through the system is indicated by the solid black lines. This requirement is generally satisfied for any desirable choices of N, $\Delta t_C$, and $\Delta t_H$, so this requirement does not usually limit the selection of these parameters.

The ports of the cold inlet and hot inlet valves connected to the chambers of these valves in communication with their rotor slots 244 will be termed the entrance ports for these valves. Fluid will enter the valves through these ports and be directed by the rotor slot 244 to the uncovered stator holes 246 and to the corresponding inlet ports of the associated beds. The ports of the cold outlet and hot outlet valves connected to the chambers of these valves in communication with their rotor slots will be termed the exit ports for these valves. Fluid passing through the rotor slots of these valves will exit the valves through these ports. The entrance and exit ports are identified in FIG. 14.

Implementation of the refrigeration cycle for a selected bed 210 in the present embodiment is described below. When the magnet assembly 208 has just rotated over this bed 210, as shown schematically on the left-hand side of FIG. 14, the rotor slot of the cold inlet valve 200 begins to uncover the stator hole connected to the cold inlet port 224 of this bed 210. Thus, an open fluid path from the entrance port 214 of the cold inlet valve 200 (which connects to the chamber in the valve in communication with the rotor slot) to the cold inlet port 224 of the selected bed 210 is established. Because the hot outlet valve 206 has the same disk alignment as the cold inlet valve 200, the slot of the rotor of the hot outlet valve 206 simultaneously uncovers the stator hole connected to the hot outlet port 226 of the selected bed 210. Thus, an open fluid path from the hot outlet port 226 of the bed 210 to the exit port 220 of the hot outlet valve 206 is established while the selected bed 210 is magnetized. Pressurized fluid provided by the pump 222, which in FIG. 14 is shown plumbed in series with the hot-side heat exchanger 238, leaves the cold-side heat exchanger 236 at temperature $T_{Ci}$ and enters the entrance port 214 of the cold inlet valve 200. This fluid passes through the rotor slot of the valve, through the uncovered hole in the stator, and is delivered to the cold inlet port 224 of the selected bed 210. This fluid passes through the bed 210, becoming warmer as it pulls heat from the hot, magnetized magnetocaloric material in the bed 210. This fluid emerges from the hot outlet port 226 of the selected bed 210 at temperature $T_{Ho}$, flows through the uncovered hole in the stator of the hot outlet valve 206, through the rotor slot, and to the exit port 220 of the hot outlet valve 206. From there, the fluid returns to the pump 222 and is sent through the hot-side heat exchanger 238, where it exhausts heat to the ambient environment. The fluid emerges from the hot-side heat exchanger at temperature $T_{Hi}$ and is available for performing the cold blow through any of the demagnetized beds.

During the hot blow (FIG. 14) for the selected bed 210, because the holes in the stators of the cold inlet 200 and hot outlet 206 valves connected to the cold inlet 224 and hot outlet 226 ports of the bed 210 are uncovered by the corresponding rotor slots, the holes in the stators of the hot inlet 204 and cold outlet 202 valves connected to the hot inlet 230 and cold outlet 228 ports of the selected bed 210 must be blocked by the rotors of these valves. Therefore, as the cold inlet valve 200 delivers flow to the cold inlet port 224 of the selected bed 210, the cold outlet valve 202 simultaneously prevents flow from entering or exiting the cold outlet port 228 of the bed 210. Similarly, as the hot outlet valve 206 passes flow from the hot outlet port 226 of the selected bed 210, the hot inlet valve 204 simultaneously prevents flow from entering or exiting the hot inlet port 230 of the bed 210. These blocked flow paths are indicated by the dashed lines in FIG. 14. The valves in this third embodiment therefore establish the desired flow from the cold inlet port 224 to the hot outlet port 226 of the selected bed 210 while it is magnetized, and prevent any other type of flow through the bed 210. Because of the choice described above for the angular extent of the rotor slots of the cold inlet 200 and hot outlet 206 valves, this desired flow pattern continues for the desired duration $\Delta t_H$ of the hot blow stage.

Continuing the example one of the beds that is undergoing its cold blow stage as the selected bed is undergoing its hot blow stage is described below. This other bed 212 is demagnetized, as illustrated in the right-hand side of FIG. 14. Because of the common positioning of the rotors of the hot inlet 204 and cold outlet 202 valves relative to the position of the magnet assembly 208, the rotor slot of the hot inlet valve 204 must have uncovered the hole in the hot inlet stator connected to the hot inlet port 232 of this other bed, and the rotor slot of the cold outlet valve 202 must have uncovered the stator hole connected to the cold outlet port 234 of this bed. The pressurized fluid that exits the hot-side heat exchanger 238 at temperature $T_{Hi}$ enters the entrance port 218 of the hot inlet valve 204, which is connected to the chamber of the valve in communication with the rotor slot of this valve. This fluid passes through the rotor slot of the hot inlet valve 204, through the uncovered hole in the hot inlet stator, and is delivered to the hot inlet port 232 of the bed 212. Flow from the hot inlet port 232 can then proceed through the bed 212, dropping in temperature as it gives up heat to the cold, demagnetized magnetocaloric material in the bed 212. This fluid at temperature $T_{Co}$ exits the bed 212 at the cold outlet port 234, passes through the corresponding hole in the stator of the cold outlet valve 202, through the rotor slot of the cold outlet valve 202, and out of the exit port 216 of the cold outlet valve 202. This fluid then enters the cold-side heat exchanger 236, absorbing heat from the refrigerated environment, allowing this environment to maintain its colder temperature. This fluid exits the cold-side heat exchanger 236 at temperature $T_{Ci}$, completing the fluid circuit. This fluid is now available for performing the hot blow for any of the magnetized beds, including the selected bed 210.

As time progresses, the hot blow of the selected bed 210 will end as the rotor slots of the cold inlet 200 and hot outlet 206 valves rotate past the stator holes connected to the cold inlet 224 and hot outlet 226 ports of the bed 210 and as the magnet assembly 208 rotates away from the selected bed 210. Once the magnet assembly 208 rotates completely away from the selected bed 210, the stator holes of the hot inlet 204 and cold outlet 202 valves, which are connected to the hot inlet 230 and cold outlet 228 ports of the selected bed 210, become uncovered by the corresponding rotor slots, allowing the cold blow to proceed through the bed 210. This cold blow is illustrated schematically in FIG. 17.

The cold blow proceeds through the holes of the stators in the hot inlet 204 and cold outlet 202 valves which are connected to the hot inlet 230 and cold outlet ports 228 of the selected bed 210. These holes are uncovered by the rotor slots of these valves. Because these stator holes are uncovered by the rotors of the hot inlet 204 and cold outlet 202 valves, the corresponding holes in the stators of the cold inlet and hot outlet valves are blocked by the rotors in these valves. Thus, the cold inlet 200 valve prevents flow from entering or exiting the cold inlet port 224 of the selected bed 210 while simultaneously, the hot outlet valve 206 prevents flow from entering or exiting the hot outlet port 226 of the bed 210. These blocked flow paths are shown as the dashed lines in FIG. 17. Flow can only proceed through the selected bed 210 from its hot inlet port 230 to its cold outlet port 228, as desired for the cold blow. The cold blow for the selected bed persists as long as the hot inlet and cold outlet rotor slots uncover the stator holes connected to the hot inlet 230 and cold outlet 228 ports of the bed 210. Because of the choice described above for the angular extent of these rotor slots, this cold blow will last for the desired duration $\Delta t_C$.

It is evident that with the pump 222 providing a near constant flow rate $\Phi$ through the system, the shorter angular extents of the rotor slots in the cold inlet/hot outlet valves (relative to the angular extents of the slots in the hot inlet/cold outlet valves) will uncover a smaller number of stator holes and therefore produce a larger flow rate through a bed during the hot blow than during the cold blow, in the same manner described for the previous embodiment. It is also evident that, as in the previous embodiment, the unequal flow rates through a bed during the hot and cold blows will satisfy Equation 10 and therefore Equation 4, as desired. Again, by adjusting the near constant flow rate $\Phi$ established by the pump 222, any desired value for the hot blow flow rate $\Phi_H$ or the cold blow flow rate $\Phi_C$ can be established. Once one of these blow flow rates is established through the choice of $\Phi$, the other blow flow rate is determined by Equation 10.

Figure 19A:
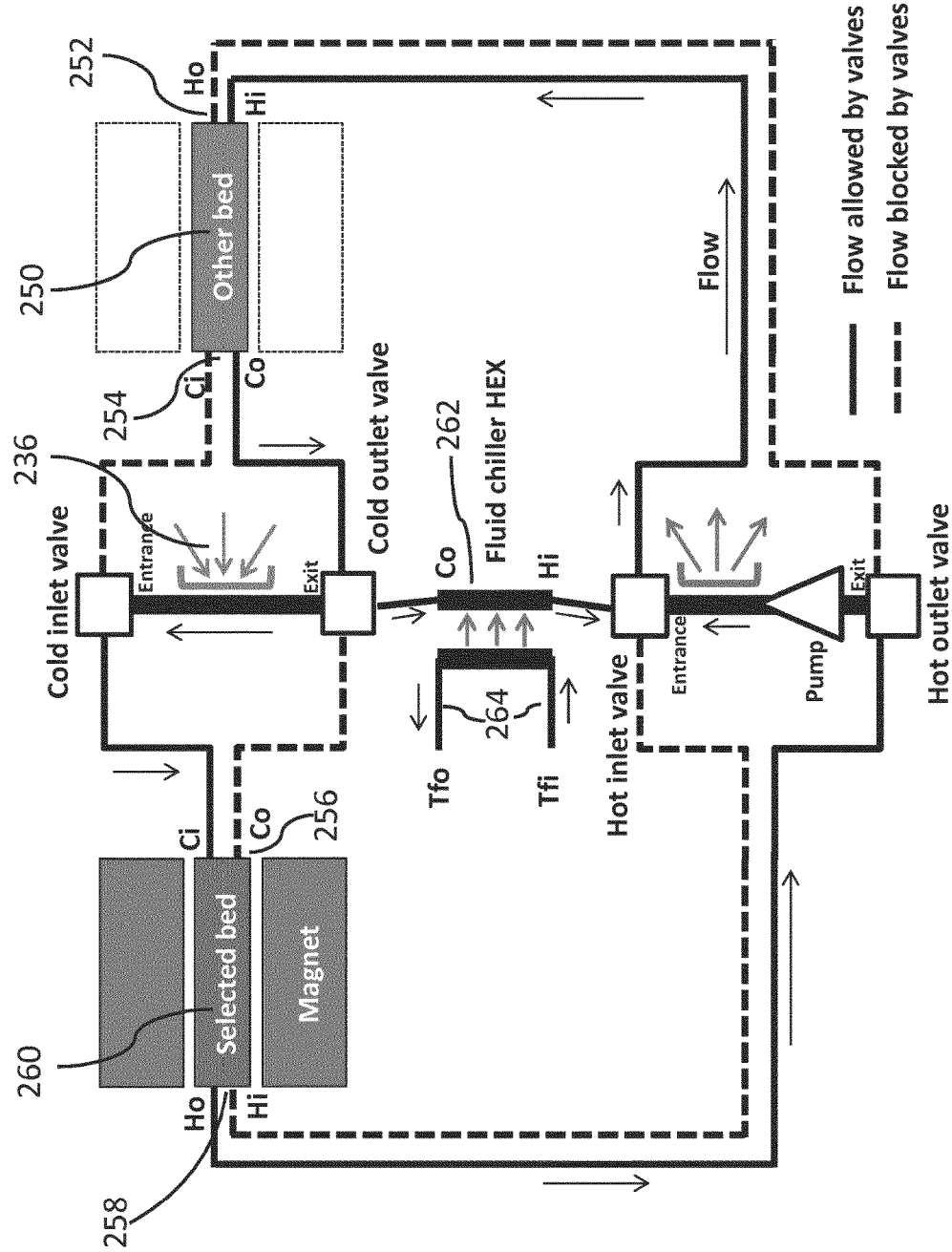
FIGS. 19A and 19B illustrate a schematic view of a magnetic refrigeration system operating as a fluid chiller in accordance with an illustrative embodiment.
Figure 19B:
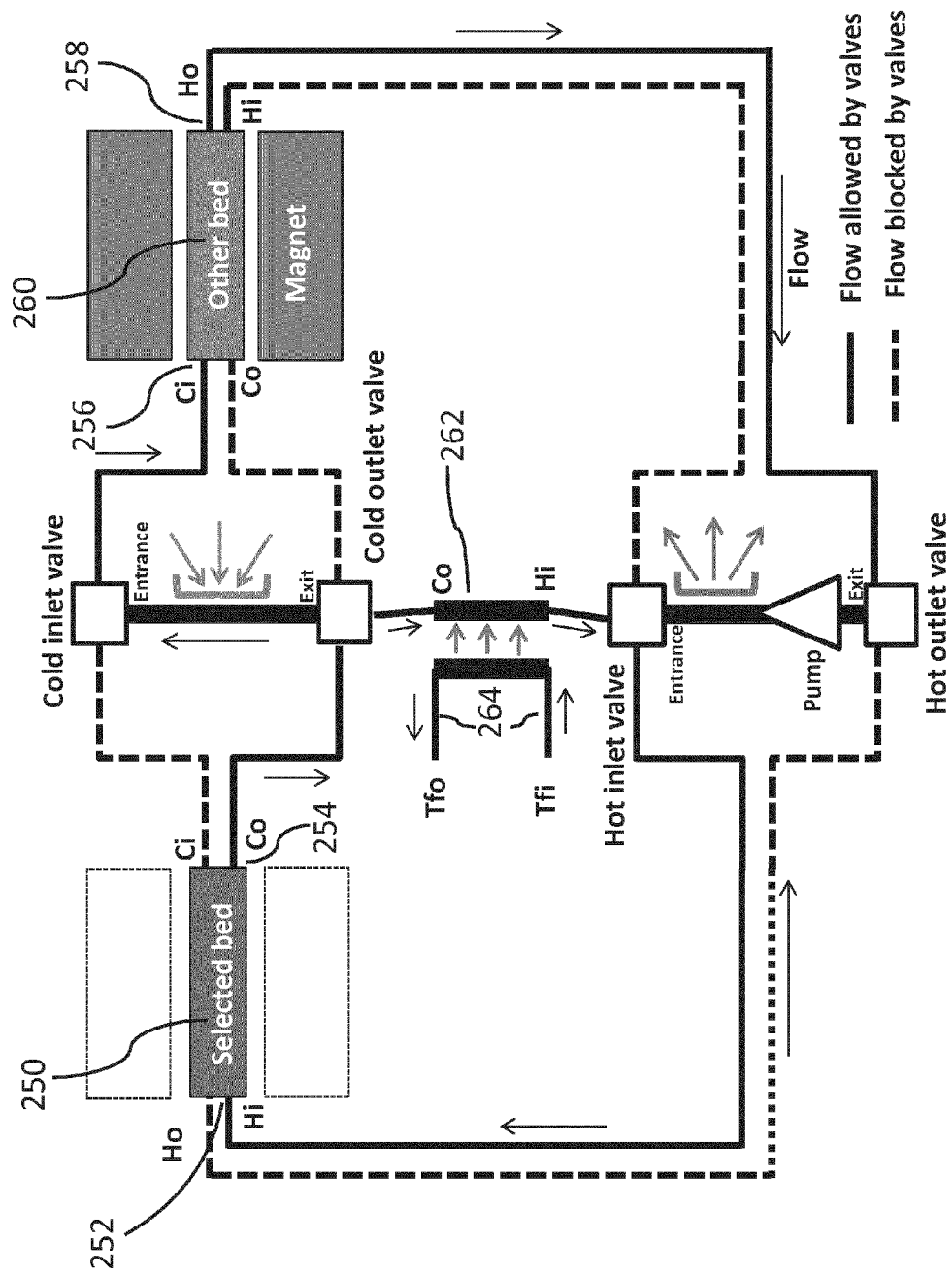

Turning now to FIGS. 19a and 19b, another magnetic refrigeration system being used as a fluid chiller is shown, in accordance with at least some embodiments of the present disclosure. Specifically, in some cooling applications (e.g. ventilation air conditioning or cooling water generation), what is desired is not the pumping of heat from a cold reservoir at $T_c$ to a hot one at $T_h$, but the cooling of an air or fluid stream from $T_h$ to $T_c$ (e.g., a "fluid chiller"). If the fluid has a temperature independent heat capacity C, the total amount of heat $Q_C$ to be removed from the fluid is $Q_C=C(T_H-T_C)$. Additionally, the minimum theoretical work W required to move a given amount of heat $Q_c$ from a cold absolute temperature $T_c$ to a hot absolute temperature $T_h$ via a reversible refrigerator is $W=Q_C(T_H-T_C)/T_C$ where the coefficient of performance (COP) may be defined as $Q_c/W$. The theoretical minimum amount of work required to cool a fluid using a single stage refrigerator that pumps all the heat from absolute temperatures $T_c$ to $T_h$ is $$W=C(T_H-T_C)^2/T_C \qquad \text{Equation 11:}$$

and the related COP $$COP=Q_C/W=(T_C/(T_H-T_C)). \qquad \text{Equation 12:}$$

Actual refrigerators may be relatively less efficient, with major losses occurring due to viscous losses in the compression and expansion of the refrigerant.

Less work may be needed if the fluid were cooled by a large number of separate refrigerators with the first cooling the fluid from $T_H$ to $T_{H-d}$ and pumping heat to $T_H$, and the next cooling the fluid from $T_{H-d}$ to $T_{H-2d}$ and pumping heat to $T_H$, etc., where $d \ll (T_H-T_C)$. This occurs because much of the cooling of the fluid is accomplished by refrigerators acting through a small temperature difference, and hence acting at high efficiency. For the ideal fluid chiller comprised of an infinite number of successive refrigerators, each of ideal efficiency, the work required would be $$W_C = -\int_{T_H}^{T_C} \frac{T_H - T}{T} dQ = \qquad \text{Equation 13}$$

$$-\int_{T_H}^{T_C} \frac{C(T_H-T)}{T} dT = C\left(T_H \ln\frac{T_H}{T_C} - (T_H - T_C)\right)$$

with the resulting COP:

$$COP=Q_C/W_C=(T_H/(T_H-T_C)\ln(T_H/T_C)-1)^{-1}. \qquad \text{Equation 14:}$$

The work input is lower than the single stage refrigerator because the generation of entropy that occurs when the initially warm fluid stream contacts the cold heat exchanger is no longer present. When $T_C$ is close to $T_H$, the best single stage refrigerator may require twice as much work input as a multi-stage ideal chiller. As the ratio of $T_H/T_C$ gets larger, the efficiency penalty may increase slightly; for example, for $T_H=100°$ F. and $T_C=45°$ F., the best single-stage refrigerator may consume 2.07 times more input work than an ideal multi-stage chiller.

An AMR-type magnetic refrigerator may be set up to act as a fluid chiller (FIGS. 19a and 19b) by sending, in total in one cycle, more AMR heat transfer fluid from the hot 252 to the cold 254 ends of the demagnetized bed 250 than is returned from the cold 256 to the hot 258 ends of the magnetized bed 260. The excess heat transfer fluid that accumulates at the cold end 254 is chilled in a nearly reversible manner from the hot inlet temperature $T_{Hi}$ to the cold outlet temperature $T_{Co}$. This excess heat transfer fluid may be re-warmed in a counter-flow heat exchanger 262 that chills an external fluid stream 264 from a temperature Tfi slightly greater than $T_{Hi}$ to a temperature Tfo slightly greater than $T_{Co}$. The external fluid stream might be water for a chilled water loop, or ventilation air for air conditioning a building. The warm excess heat transfer fluid may be returned to the hot end 252 of the demagnetized AMR bed 250, once again becoming the excess heat transfer fluid flowing from the hot to cold ends of the AMR bed 250. If the ratio f is not too high, the fluid chiller may also be used to carry a conventional refrigeration load, removing heat from a cold space at a temperature slightly above the cold inlet temperature $T_{Ci}$ via a cold heat exchanger 236.

The benefits in reduced magnet mass of decreasing the hot blow duration and increasing the cold blow duration may still apply for the fluid chiller AMR case, but the governing equation for the flow rates in the hot blow and cold blow changes. Let f be the fraction of the fluid flow emerging from the demagnetized beds that is diverted to the fluid chilling heat exchanger (HEX) and returned to the hot side of the AMR beds. Fluid continuity requires that equation 4 be modified to account for the fraction f of the cold blow fluid that is diverted to the fluid chiller HEX, leaving the fraction 1–f of the flow available for the return hot blow:

$$\Delta t_H \Phi_H = (1-f) \Delta t_C \Phi_C \qquad \text{Equation 15:}$$

where $\Phi_H$ is the hot blow flow rate, $\Phi_C$ the cold blow flow rate, $\Delta t_H$ and $\Delta t_C$ the hot and cold blow durations, and f the fraction of cold blow fluid that is diverted to the fluid chiller HEX.

Any of the aspects of the magnetic refrigeration systems described herein may be controlled at least in part by computer-readable instructions stored on a computer-readable medium, such as a computer memory. Upon execution of the computer-readable instructions by a processor-based computing device, the operations are performed to control operation of the MR system.

One or more flow diagrams and/or block diagrams have been used to describe illustrative embodiments. The use of any flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A magnetic refrigeration system, comprising:
   one or more beds of magnetocaloric material, each having a hot side and a cold side;
   a magnet configured to apply a time-varying magnetic field to the one or more beds in a high state and a low state;
   a heat transfer fluid;
   a hot side heat exchanger (HHEX);
   a cold side heat exchanger (CHEX);
   a hot side valve and a cold side valve that are configured to control flow of the heat transfer fluid to the one or more beds of magnetocaloric material; and
   a pump or a set of displacers configured to circulate the heat transfer fluid through the one or more beds, the HHEX, and the CHEX, wherein:
   flow of the heat transfer fluid is controlled to be at an average flow rate of $\Phi_H$ for a duration $\Delta t_H$ from the cold side of the one or more beds to the hot side of the respective bed when the time-varying magnetic field applied to the respective bed is in the high state, the flow of the heat transfer fluid is controlled to be at an average flow rate of $\Phi_C$ for a duration $\Delta t_C$ from the hot side of the one or more beds to the cold side of the respective bed when the time-varying magnetic field applied to the respective bed is in the low state, $\Delta t_C > \Delta t_H$ and $\Phi_C < \Phi_H$ and $\Delta t_H \Phi_H = \Delta t_C \Phi_C$, and $\Delta t_H < 0.8 \times \Delta t_C$ and $\Phi_C < 0.8 \times \Phi_H$.

2. The magnetic refrigeration system of claim 1, wherein $\Delta t_H < 0.5 \times \Delta t_C$ and $\Phi_C < 0.5 \times \Phi_H$.

3. The magnetic refrigeration system of claim 1, wherein the time-varying magnetic field applied to the one or more beds is accomplished by a relative rotation of the one or more beds and a magnetic field of the magnet.

4. The magnetic refrigeration system of claim 3, wherein the relative rotation of the one or more beds and the magnetic field of the magnet is accomplished by at least one of rotating the one or more beds into and out of the magnetic field of the magnet and rotating the magnetic field of the magnet about the one or more beds.

5. The magnetic refrigeration system of claim 1, wherein the flow of the heat transfer fluid is controlled to pass the heat transfer fluid through the HHEX when the time-varying magnetic field applied to the respective bed is in the high state, and the flow of the heat transfer fluid is controlled to pass the heat transfer fluid through the CHEX when the time-varying magnetic field applied to the respective bed is in the low state.

6. The magnetic refrigeration system of claim 1, wherein the magnet comprises a portion of an annular gap, and
wherein the portion of the annular gap has an angular extent that is proportional to a time duration that the magnet applies the time-varying magnetic field in the high state to a bed of the one or more beds.

7. The magnetic refrigeration system of claim 6, wherein the angular extent of the annular gap is less than 170 degrees.

8. The magnetic refrigeration system of claim 6, wherein the angular extent of the annular gap is less than 150 degrees.

9. The magnetic refrigeration system of claim 6, wherein the angular extent of the annular gap is less than 130 degrees.

10. The magnetic refrigeration system of claim 1, further comprising:
a hot blow fluid path with conduits of a first wetted diameter, wherein the hot blow fluid path is configured to direct the heat transfer fluid from the one or more beds to the HHEX; and
a cold blow fluid path with conduits of a second wetted diameter, wherein the cold blow fluid path is configured to direct the heat transfer fluid from the one or more beds to the CHEX,
wherein the first wetted diameter is greater than the second wetted diameter.

11. The magnetic refrigeration system of claim 1, wherein a valve configured to control the flow of the heat transfer fluid comprises a first rotor and a first stator,
wherein the first stator comprises an inner slot and an outer slot,
wherein the first rotor comprises inner holes corresponding to the inner slot of the first stator and outer holes corresponding to the outer slot of the first stator,
wherein the inner slot of the first stator is configured to uncover a portion of the inner holes of the first rotor, and the outer slot of the first stator is configured to uncover a portion of the outer holes of the first rotor, and
wherein each inner hole of the first rotor corresponds to an outer hole of the first rotor,
wherein the first stator and the first rotor are configured to rotate relative to each other such that if an inner hole of the first rotor is uncovered by the inner slot of the first stator, the corresponding outer hole of the first rotor is not uncovered by the outer slot of the first stator and if an outer hole of the first rotor is uncovered by the outer slot of the first stator, the corresponding inner hole of the first rotor is not uncovered by the outer slot of the first stator.

12. The magnetic refrigeration system of claim 11, wherein the inner slot of the first stator comprises a portion of a first annulus with a first angular extent, and
wherein the outer slot of the first stator comprises a portion of a second annulus with a second angular extent.

13. The magnetic refrigeration system of claim 12, wherein the first angular extent is greater than the second angular extent.

14. The magnetic refrigeration system of claim 12, wherein the first angular extent does not overlap the second angular extent.

15. The magnetic refrigeration system of claim 11, wherein the valve further comprises a second rotor and a second stator,
wherein the second stator comprises an inner slot and an outer slot,
wherein the second rotor comprises inner holes corresponding to the inner slot of the second stator and outer holes corresponding to the outer slot of the second stator,
wherein the inner slot of the second stator is configured to uncover a portion of the inner holes of the second rotor, and the outer slot of the second stator is configured to uncover a portion of the outer holes of the second rotor, and
wherein each inner hole of the second rotor corresponds to an outer hole of the second rotor,
wherein the second stator and the second rotor are configured to rotate relative to each other such that if an inner hole of the second rotor is uncovered by the inner slot of the second stator, the corresponding outer hole of the second rotor is not uncovered by the outer slot of the second stator and if an outer hole of the second rotor is uncovered by the outer slot of the second stator, the corresponding inner hole of the second rotor is not uncovered by the inner slot of the second stator.

16. The magnetic refrigeration system of claim 15, wherein the inner slot of the second stator comprises a portion of a third annulus with a third angular extent,
wherein the outer slot of the second stator comprises a portion of a fourth annulus with a fourth angular extent, and
wherein the third angular extent is greater than the fourth angular extent.

17. The magnetic refrigeration system of claim 1, wherein:
the one or more beds comprises three or more beds of magnetocaloric material; and
the magnetic refrigeration system further comprises:
a first inlet valve comprising a first part with a series of holes, each connected to the cold side of a bed of the three or more beds, and a second part with a slot fluidly connected to the CHEX;
a first outlet valve comprising a first part with a series of holes, each connected to the hot side of a bed of the three or more beds, and a second part with a slot fluidly connected to the HHEX;
a second inlet valve comprising a first part with a series of holes, each connected to a hot side of a bed of the three or more beds, and a second part with a slot fluidly connected to the HHEX; and
a second outlet valve comprising a first part with a series of holes, each connected to a cold side of a bed of the three or more beds, and a second part with a slot fluidly connected to the CHEX;
wherein the slot in the first inlet valve and the slot in the first outlet valve are configured to allow flow of the heat transfer fluid at the average flow rate of $\Phi_H$ for the duration $\Delta t_H$ from the cold side of each of the three or more beds to the hot side of each of the three or more beds when the magnetic field applied to the respective beds are in the high state, and
wherein the slot in the second inlet valve and the slot in the second outlet valve are configured to allow flow of the heat transfer fluid at the average flow rate of $\Phi_C$ for the duration $\Delta t_C$ from the hot side of each of the three or more beds to the cold side of each of the three or more beds when the magnetic field applied to the respective beds are in the low state.

18. The magnetic refrigeration system of claim 17, wherein the time-varying magnetic field applied to the three or more beds is accomplished by a relative rotation of the one or more beds and a magnetic field of the magnet.

19. The magnetic refrigeration system of claim 18, wherein the relative rotation of the one or more beds and the magnetic field of the magnet is accomplished by rotating the three or more beds into and out of the magnetic field of the magnet.

20. The magnetic refrigeration system of claim 18, wherein the relative rotation of the three or more beds and the magnetic field of the magnet is accomplished by rotating the magnetic field of the magnet about the one or more beds.

21. The magnetic refrigeration system of claim 17, where the magnet comprises a portion of an annular gap, and
wherein the portion of the annular gap has an angular extent that is proportional to a time duration that the magnet applies the time-varying magnetic field in the high state to a bed of the three or more beds.

22. The magnetic refrigeration system of claim 1, further comprising a fluid chilling heat exchanger (HEX), wherein the magnetic refrigeration system is configured to operate in a first mode and a second mode, and further wherein:
in the first mode of operation $\Delta t_C > \Delta t_H$ and $\Phi_C < \Phi_H$ and $\Delta t_H \Phi_H = \Delta t_C \Phi_C$; and
in the second mode of operation:
one or more valves are configured to direct a fraction f of the heat transfer fluid emerging from the cold side of each of the one or more beds to the HEX and to the hot side of the respective bed when the magnetic field applied to the respective bed is in the low state, wherein $\Delta t_C > \Delta t_H$ and $\Delta t_H \Phi_H = (1-f)\Delta t_C \Phi_C$.

23. A magnetic refrigeration apparatus, comprising:
three or more beds of magnetocaloric material, each having a hot side and a cold side;
a magnet configured to apply a time-varying magnetic field to the three or more beds a heat transfer fluid;
a hot side heat exchanger (HHEX);
a cold side heat exchanger (CHEX);
a pump or a set of displacers configured to circulate the heat transfer fluid through the three or more beds, the HHEX, and the CHEX;
a cold side valve with a first radius from a center of the cold side valve and a second radius from the center of the cold side valve comprising:
a first part with a first series of holes along the first radius and a second series of holes along the second radius, wherein the first series of holes each fluidly connect to a cold inlet conduit of each of the three or more beds, and wherein the second series of holes each connect to a cold outlet conduit of each of the three or more beds; and
a second part with a first slot along the first radius fluidly connected to an outlet of the CHEX and a second slot along the second radius fluidly connected to an inlet of the CHEX; and
a hot side valve with a third radius from a center of the hot side valve and a fourth radius from the center of the hot side valve comprising:
a first part with a third series of holes along the third radius and a fourth series of holes along the fourth radius, wherein the third series of holes each fluidly connect to a hot inlet conduit of each of the three or more beds, and wherein the fourth series of holes each fluidly connect to a hot outlet conduit of each of the three or more beds; and
a second part with a third slot along the third radius fluidly connected to an outlet of the HHEX and a fourth slot along the fourth radius fluidly connected to an inlet of the HHEX,
wherein the first slot, the second slot, the third slot, and the fourth slot are configured to allow flow of heat transfer fluid at an average flow rate of $\Phi_H$ for a duration $\Delta t_H$ from the cold side of each of the three or more beds to the hot side of the respective beds when the magnetic field applied to the respective beds is in the high state, and
wherein the first slot, the second slot, the third slot, and the fourth slot are further configured to allow flow of heat transfer fluid at an average flow rate of $\Phi_C$ for a duration $\Delta t_C$ from the hot side of each of the three or more beds to the cold side of the respective beds when the magnetic field applied to the respective beds is in the low state, and wherein $\Delta t_C > \Delta t_H$ and $\Phi_C < \Phi_H$ and $\Delta t_H \Phi_H = \Delta t_C \Phi_C$.

24. The magnetic refrigeration system of claim 23, wherein the time-varying magnetic field applied to the three or more beds is accomplished by a relative rotation of the one or more beds and a magnetic field of the magnet.

25. The magnetic refrigeration system of claim 24, wherein the relative rotation of the three or more beds and the magnetic field of the magnet is accomplished by rotating the one or more beds into and out of the magnetic field of the magnet.

26. The magnetic refrigeration system of claim 24, wherein the relative rotation of the three or more beds and the magnetic field of the magnet is accomplished by rotating the magnetic field of the magnet about the one or more beds.

27. The magnetic refrigeration system of claim 23, where the magnet comprises a portion of an annular gap, and
wherein the portion of the annular gap has an angular extent that is proportional to a time duration that the magnet applies the time-varying magnetic field in the high state to a bed of the three or more beds.

28. A method comprising:
rotating a plurality of beds of magnetocaloric material into and out of a magnetic field of a magnet to create a time-varying magnetic field with a high state and a low state, wherein the time-varying magnetic field is applied to each of the plurality of beds, and
rotating a valve to control flow of a heat transfer fluid at an average flow rate of $\Phi_H$ for a duration of $\Delta t_H$ from a cold side of each of the plurality of beds to a hot side of the respective bed when the time-varying magnetic field applied to the respective bed is in the high state,
wherein rotating the valve also controls flow of the heat transfer fluid at an average flow rate of $\Phi_C$ for a duration $\Delta t_C$ from the hot side of each of the plurality of beds to the cold side of the respective bed when the time-varying magnetic field applied to the respective bed is in the low state, wherein $\Delta t_C > \Delta t_H$ and $\Phi_C < \Phi_H$ and $\Delta t_H \Phi_H = \Delta t_C \Phi_C$, and wherein $\Delta t_H < 0.8 \times \Delta t_C$ and $\Phi_C < 0.8 \times \Phi_H$.

29. A method comprising:
rotating a magnetic field of a magnet about a plurality of beds of magnetocaloric material to create a time-varying magnetic field with respect to each of the plurality of beds with a high state and a low state, and
rotating a valve to control flow of a heat transfer fluid at an average flow rate of $\Phi_H$ for a duration of $\Delta t_H$ from a cold side of each of the plurality of beds to a hot side of the respective bed when the time-varying magnetic field applied to the respective bed is in the high state,
wherein rotating the valve also controls flow of the heat transfer fluid at an average flow rate of $\Phi_C$ for a duration $\Delta t_C$ from the hot side of each of the plurality of beds to the cold side of the respective bed when the time-varying magnetic field applied to the respective bed is in the low state, and wherein $\Delta t_C > \Delta t_H$ and $\Phi_C < \Phi_H$ and $\Delta t_H \Phi_H = \Delta t_C \Phi_C$, and wherein $\Delta t_H < 0.8 \times \Delta t_C$ and $\Phi_C < 0.8 \times \Phi_H$.

* * * * *